(12) United States Patent
Uchiumi et al.

(10) Patent No.: US 6,329,480 B1
(45) Date of Patent: Dec. 11, 2001

(54) PREPARATION PROCESS OF ACRYLIC ACID ESTER POLYMER

(75) Inventors: Naohiko Uchiumi, Kurashiki; Kenichi Hamada, Tsukuba; Masaji Kato, Tsukuba; Tomohiro Ono, Tsukuba; Sachie Yaginuma, Tsukuba; Kazushige Ishiura, Tsukuba, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/274,473

(22) Filed: Mar. 23, 1999

(30) Foreign Application Priority Data

Mar. 23, 1998 (JP) .................................. 10-094021
May 25, 1998 (JP) .................................. 10-159940

(51) Int. Cl.$^7$ .................. C08F 4/46; C08F 4/52
(52) U.S. Cl. .................. 526/173; 526/176; 526/177; 526/178; 526/187; 526/328; 526/329.7
(58) Field of Search .................. 526/187, 189, 526/329.7, 177, 176, 178, 328, 173

(56) References Cited

U.S. PATENT DOCUMENTS

| 5,180,799 | 1/1993 | Ballard et al. | 526/177 |
| 5,656,704 | 8/1997 | Wang et al. | 526/187 |

FOREIGN PATENT DOCUMENTS

| 195 30 398 | 2/1996 | (DE) . |
| 0 686 647 | 12/1995 | (EP) . |

OTHER PUBLICATIONS

Macromolecules 1994, 27, 4890–4895; "Anionic Polymerization of Acrylic Monomers. 17. Ligated Anionic Living Polymerization of 2-Ethylhexyl Acrylate As Promoted by Polydentate Lithium Alkoxides", J.S. Wang, et al.

Macromolecules 1994, 4908–4913, "Anionic Polymerization of Acrylic Monomers. 21. Anionic Sequential Polymerization of 2–Ethylhexyl Acrylate and Methyl Methacrylate", J.S. Wang, et al.

Macromolecules 1992, 25 5907–5913, "Controlled Polymerization of Methyl Methacrylate Using Lithium Aluminum Alkyls", D.G.H. Ballard, et al.

Journal of Polymer Science: Part A: Polymer Chemistry, vol. 35, 361–369 (1997), "Anionic Polymerization of Primary Acrylates as Promoted by Lithium 2–(2–Methoxyethoxy) Ethoxide", N. Nugay, et al.

Polymer Preprints, Japan, vol. 46, No. 7 (1997), 1081–1082.

Polymer Preprints, Japan, vol. 47, No. 2 (1998), 179.

Makromol. Chem. Supplement 15, 167–185 (1989), "Living and highly syndiotactic polymerization of methyl methacrylate and other methacrylates by tert–butyllithium–trialkyaluminium in toulene", Tatsuki Kitayama, et al.

*Primary Examiner*—David W. Wu
*Assistant Examiner*—Tanya Zalukaeva
(74) *Attorney, Agent, or Firm*—Oblon, Spivak, McClelland, Maier & Neustadt, P.C.

(57) ABSTRACT

A process for the preparation of an acrylic acid ester polymer, includes carrying out polymerization of an acrylic acid ester or block copolymerization of an acrylic acid ester and another (meth)acrylic monomer in the presence of an organolithium compound and an organoaluminum compound represented by the following formula (I):

$$AlR^1R^2R^3 \qquad (I)$$

wherein $R^1$ represents an alkyl group having at least 3 carbon atoms, an alkoxy group having at least 3 carbon atoms or an aryloxy group, $R^2$ and $R^3$ each independently represent an aryloxy group or may be coupled together to form an arylenedioxy group. The process makes it possible to increase the reaction rate and living properties upon polymerization and increase the block formation efficiency upon block copolymerization.

20 Claims, 2 Drawing Sheets

PREPARATION PROCESS OF ACRYLIC ACID ESTER POLYMER

BACKGROUND OF THE INVENTION

1. Field of the Invention

The present invention relates to a preparation process for acrylic acid ester polymers. More specifically, the present invention pertains to a preparation process of acrylic acid ester polymers including acrylic acid ester homopolymers and block copolymers having at least one polymer block comprising an acrylic acid ester.

2. Description of the Background

On the anionic polymerization of an acrylic acid ester, the following reports (1) and (2) have been made.

(1) An acrylic acid ester homopolymer is available by the solution polymerization of an acrylic acid ester under low-temperature conditions of −78° C. or so in a mixed solvent of toluene and tetrahydrofuran by using an organolithium compound as a polymerization initiator and lithium 2-(2-methoxyethoxy)ethoxide as an additive. A block copolymer having an acrylic acid ester polymer block and a methyl methacrylate polymer block is available by successively carrying out polymerization of an acrylic acid ester and polymerization of methyl methacrylate under the polymerization conditions similar to the above. (See Macromolecules, 27, 4890–4895(1994); Macromolecules, 27, 4908–4913(1994); Journal of Polymer Science: Part A: Polymer Chemistry, 35, 361–369(1997), et al.)

(2) An acrylic acid ester homopolymer is available by the solution polymerization of an acrylic acid ester in toluene under temperature conditions of −60° C. or −78° C. by using t-butyl lithium as a polymerization initiator and methylbis (2,6-di-t-butylphenoxy)aluminum or ethylbis(2,6-di-t-butylphenoxy)aluminum as an additive. A block copolymer having an acrylic acid ester polymer block and a methacrylic acid ester polymer block is available by successively or simultaneously carrying out polymerization of an acrylic acid ester and polymerization of a methacrylic acid ester under the polymerization conditions similar to the above. (See Polymer Preprints, Japan, 46(7), 1081–1082(1997) and ibid, 47(2), 179(1998).)

Anionic polymerization processes which, however, do not relate to an acrylic acid ester but a methacrylic acid ester have been reported as described below in (3) to (6).

(3) Poly(methyl methacrylate) having at least 80% of syndiotacticity is formed by the solution polymerization of methyl methacrylate in toluene by using t-butyl lithium as a polymerization initiator and a trialkyl aluminum as an additive. (See Makromol. Chem., Supplement, 15, 167–185 (1989).)

(4) Poly(methyl methacrylate) having syndiotacticity of about 70% is formed by the solution polymerization of methyl methacrylate in toluene in the presence of diisobutyl (2,6-di-t-butyl-4-methylphenoxy)aluminum by using t-butyl lithium as a polymerization initiator. (See Macromolecules, 25, 5907–5913(1992).)

(5) A methacrylic acid ester polymer having a narrow molecular weight distribution is formed by polymerizing a methacrylic acid ester at a temperature range of from −20° C. to +60° C. by using an organic alkali metal compound such as t-butyl lithium as an initiator and a specific organoaluminum compound having at least one bulky group (for example, triisobutylaluminum, diisobutyl(2,6-di-t-butyl-4-methylphenoxy)aluminum, or the like) as an additive. This polymerization process can be applied to the preparation of a block copolymer. (See, U.S. Pat. No. 5,180,799.)

(6) Poly(methyl methacrylate) having an at least 70% content of syndiotactic triads can be obtained by mixing an organolithium initiator with a ligand such as methylbis (2,6-di-t-butylphenoxy)aluminum, ethylbis(2,6-di-t-butylphenoxy)aluminum, isobutylbis (2,6-di-t-butylphenoxy)aluminum or tris(2,6-di-t-butylphenoxy) aluminum at a temperature of at least 0° C. and then adding methyl methacrylate to the resulting mixture to anionically polymerize said methyl methacrylate. This process is applicable to the preparation of a block copolymer having a polymer block composed of methyl methacrylate and another polymer block composed of a monomer selected from another methacrylic monomer, aromatic vinyl monomer, diene and maleimide. (See U.S. Pat. No. 5,656,704.)

According to the U.S. Pat. No. 5,180,799 described above in (5), the polymerization reaction is suppressed when the anionic polymerization process of a methacrylic acid ester as described in the patent in the presence of an organoaluminum compound having a bulky group is applied to an acrylic hydrogen atom-containing monomer.

Upon anionic polymerization of a monomer on an industrial scale, it is not completely avoidable that a polymerization initiator to be used has already been partially deactivated and the deactivation of the polymerization initiator proceeds further in the polymerization system owing to the impurities, such as water, which are introduced into the polymerization system as a mixture with the monomer, solvent or the like. Accordingly, it is impossible to prepare a polymer having a desired molecular weight with good reproducibility even by carrying out anionic polymerization using stoichiometric amounts of a polymerization initiator and a monomer calculated based on the desired molecular weight of the polymer. When the living properties in anionic polymerization are high, in other words, when a living polymer with a long-life active anionic end is formed in the reaction system, a polymer having a desired molecular weight and a narrow molecular weight distribution can be prepared with good reproducibility by polymerizing a monomer in an amount smaller than the stoichiometric amount calculated based on the amount of a polymerization initiator used, thereby forming a living polymer; and polymerizing the additional amount of the monomer with the living polymer, after measuring the molecular weight of the living polymer, calculating the number of moles of the living polymer based on the molecular weight of the living polymer and amount of the monomer, and calculating the additional amount of the monomer based on the molecular weight and the number of moles of the living polymer and the desired molecular weight of the final polymer. When the living properties are low in the anionic polymerization, on the other hand, even if a two-stage polymerization technique as described above is employed, a polymer available by the second stage polymerization inevitably has both a component lower in molecular weight and a component higher in molecular weight, than that desired and therefore has a wide molecular weight distribution. This results from the time-dependent marked deactivation of anions at the end of the polymer obtained by the first polymerization. Low living properties in the anionic polymerization are accompanied by deactivation which proceeds even during the polymerization reaction so that at a relatively low polymerization rate, the molecular weight distribution of the resulting polymer inevitably becomes wide even by the first-stage polymerizing operation.

For the preparation of a block copolymer by anionic polymerization, a technique of polymerizing a certain monomer to form its living polymer and then adding another monomer to the polymerization system tends to be adopted. Also in this case, the living properties have a large influence on the block formation efficiency.

Since the anionic polymerization of a monomer such as an acrylic acid ester is an exothermic reaction, so that when such anionic polymerization is carried out under cooling conditions in an industrial scale, it becomes very important to control the temperature rise in the polymerization system due to the exothermic heat. With a view to overcoming this problem, a technique of continuously feeding a monomer to the reaction system at a predetermined rate, thereby controlling the polymerization rate is sometimes adopted. When polymerization is conducted by continuously feeding a monomer, however, living properties in the polymerization reaction tend to have an influence on the uniformity of the molecular weight distribution of the resulting polymer. In other words, not so high living properties inevitably widen the molecular weight distribution of the resulting polymer.

Also in the case where after anionic polymerization, the resulting polymer having an active anionic end is reacted with a functionalizing agent to prepare a polymer having at an end thereof a functional group, high living properties are required for heightening the introduction ratio of a functional group.

In the preparation process of an acrylic acid ester polymer as described in (1), use of tetrahydrofuran as a part of a solvent is necessary in order to polymerize an acrylic acid ester with high living properties, thereby obtaining the desired polymer in a high yield. It is however not easy to industrially use tetrahydrofuran or collect and purify tetrahydrofuran at high purity because of its water absorption properties or mixing with peroxides. When a primary alkyl acrylate such as n-butyl acrylate is used as an acrylic acid ester, polymerization at markedly low temperature conditions, as low as about −80° C., is required in order to attain high living properties. It is difficult to industrially apply this process, because, as described above, it needs a solvent which is not suitable for use in bulk judging from its handling properties and in addition, large cooling utilities must be used.

In the preparation process of an acrylic acid ester polymer described in (2), it takes a long time to complete polymerization when the temperature of the polymerization system is markedly low, about −78° C., since the polymerization rate is low. When the temperature of the polymerization system is relatively high, −60° C. or higher, on the other hand, deterioration in the living properties occurs, which widens the molecular weight distribution of the resulting polymer or makes it difficult to control the molecular weight by the two-stage polymerization process as described above. When a block copolymer is prepared as an acrylic acid ester polymer, the anionic end of the growing species has an insufficiently long life, so that the block formation efficiency is insufficient and it is difficult to prepare a high-purity block copolymer having a narrow molecular weight distribution on an industrial scale. The process of (2) is therefore industrially disadvantageous.

In the case of anionic polymerization of a methacrylic acid ester in the presence of an initiator system composed of an organic alkali metal compound and an organoaluminum compound, as is adopted in the above-described processes (3) to (6), since the addition of the organoaluminum compound is effective for suppressing the side reaction of the anion of the growing species against the ester group of the methacrylic acid ester monomer, a methacrylic acid ester polymer having a narrow molecular weight distribution can be obtained. In the above-described U.S. Pat. No. 5,180,799, it is described that the polymerizing reaction is suppressed when the anionic polymerization process of a methacrylic acid ester as described in the above patent specification is applied to an acrylic hydrogen atom-containing monomer. The present inventors tried to apply some of the anionic polymerization processes of a methacrylic acid ester as described in (3) to (6) to the polymerization of an acrylic acid ester, which however did not bring about good results. The polymerization of a primary alkyl acrylate was found to be particularly difficult. These results are presumed to owe to the side reaction with the ester group of the acrylic acid ester monomer, deprotonation at the a-position of the acrylic acid ester monomer and polymer, attack at the ester group of the polymer, or the like, each derived from the anion of the polymerization initiator and/or growing species.

The present inventors also tried to apply some of the anionic polymerization processes for a methacrylic acid ester as described in (3) to (6) to the preparation of a block copolymer having a polymer block of a methacrylic acid ester and a polymer block of an acrylic acid ester (particularly, a primary alkyl acrylate), however, the results were undesirable. The formation of a polymer block composed of an acrylic acid ester was found to cause great difficulty and the formation of a polymer block composed of a primary alkyl acrylate was found to be particularly difficult. The reason is presumed to be as follows: even if the anionic polymerization of a methacrylic acid ester proceeds stoichiometrically and a methacrylic acid ester polymer having an active anionic end is formed, the subsequent addition of an acrylic acid ester to the system considerably lowers the block formation efficiency of the acrylic acid ester at the active anionic end owing to the side reaction with the ester group of the acrylic acid ester monomer, deprotonation at the o-position of the acrylic acid ester monomer and acrylic acid ester polymer portion and attack to the ester group of the acrylic acid ester polymer portion.

SUMMARY OF THE INVENTION

An object of the present invention is to provide an industrially advantageous process which permits the polymerization of an acrylic acid ester such as a primary alkyl acrylate by anionic polymerization while attaining both a high polymerization rate and high living properties (accordingly, permits the copolymerization at a high block forming efficiency in the block copolymerization) even without using a solvent which involves a problem in handling; and makes it possible to smoothly prepare an acrylic acid ester polymer having a desired molecular weight and a narrow molecular weight distribution with good reproducibility.

With a view to attaining the above object, the present inventors have carried out various investigations. As a result, it has been found that when an initiator system is constituted from an organolithium compound and a specific organoaluminum compound, (i) polymerization of an acrylic acid ester can be carried out at a high reaction rate and with high living properties even if a solvent involving a problem in handling is not used; (ii) a high block formation efficiency can be attained when block copolymerization is carried out using an acrylic acid ester and another monomer in combination; and (iii) the above-described effects (i) and (ii) are particularly marked when a primary alkyl acrylate is used as an acrylic acid ester, leading to the completion of the present invention.

In the present invention, there is thus provided a process for the preparation of an acrylic acid ester polymer, which comprises polymerizing an acrylic acid ester in the presence of an organolithium compound and an organoaluminum compound represented by the following formula (I):

$$AlR^1R^2R^3 \quad (I)$$

wherein $R^1$ represents a substituted or unsubstituted alkyl group having at least 3 carbon atoms, a substituted or unsubstituted alkoxy group having at least 3 carbon atoms or a substituted or unsubstituted aryloxy group, $R^2$ and $R^3$ each independently represents a substituted or unsubstituted aryloxy group or may be coupled together to form a substituted or unsubstituted arylenedioxy group.

The preparation process of the present invention embraces a process for the preparation of a block copolymer having at least one polymer block (A) comprising an acrylic acid ester (a) and at least one polymer block (B) comprising another acrylic or methacrylic monomer (b) having a chemical structure different from said acrylic acid ester (a), which comprises polymerizing said acrylic acid ester (a) and said monomer (b) in the presence of an organolithium compound and an organoaluminum compound represented by the above-described formula (I).

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE INVENTION

Figure 1:
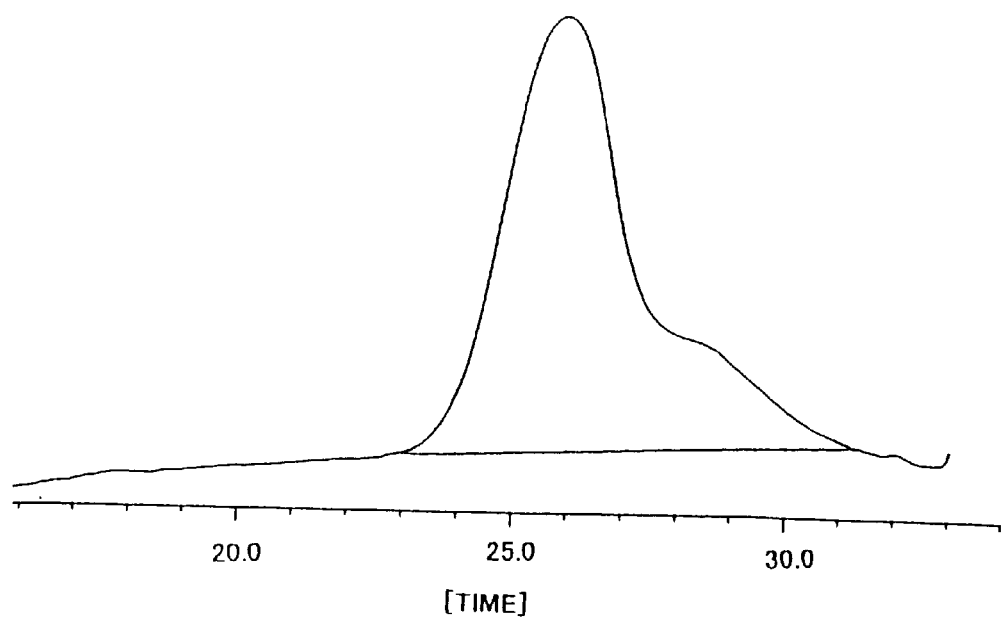
FIG. 1 is a GPC chart of poly(n-butyl acrylate) obtained as a final product in Example 5 according to the present invention, drawn with the efflux time as abscissa.

In the present invention, polymerization of an acrylic acid ester in the presence of an organolithium compound and an organoaluminum compound represented by the above formula (I) (hereinafter simply referred to as "organoaluminum compound (I)") is necessary. The "acrylic acid ester polymer" which is a target compound of the preparation process of the present invention means a polymer composed at least partially of a structural unit derived from an acrylic acid ester. It does not mean only an acrylic acid ester homopolymer but also embraces a copolymer of an acrylic acid ester and another anionic polymerizable monomer (for example, a block copolymer having at least one polymer block (A) comprising the above-described acrylic acid ester (a) and at least one polymer block (B) comprising an acrylic or methacrylic monomer (b) different in the chemical structure from said acrylic acid ester (a) (the monomer (b) and the block copolymer may hereinafter be referred to as "(meth)acrylic monomer (b)" and "block copolymer (C)", respectively)). Upon preparation of the block copolymer (C), it is therefore necessary to subject the acrylic acid ester (a) and (meth) acrylic monomer (b) to block copolymerization in the presence of an organolithium compound and an organoaluminum compound (I).

The organolithium compound to be used in the present invention generally serves as a polymerization initiator. There is no particular limitation imposed on the nature of the organolithium compound insofar as it is an organolithium compound conventionally employed as an anionic polymerization initiator upon the polymerization of an anionic polymerizable monomer such as an acrylic acid ester. Typical examples of the organolithium compound usable in the present invention include, as a monofunctional anionic polymerization initiator, alkyl lithiums such as n-butyl lithium, sec-butyl lithium and t-butyl lithium, aryl lithiums such as fluorenyl lithium and lithium salts of a monoanion based on an α-methylstyrene oligomer, aralkyl lithiums such as 1,1-diphenylhexyl lithium, diphenylmethyl lithium and 1,1-diphenyl-3-methylpentyl lithium, trimethylsiloxy lithium and lithium ethyl isobutylate; and as a bifunctional anionic polymerization initiator, organic dilithium compounds such as tetra-α-methylstyrene dilithium, 1,3-bis (lithio-1,3-dimethylpentyl)benzene and 1,3-bis (lithiophenyl-3-methylpentyl)benzene. These organolithium compounds may be used either singly or in combination. Among the above exemplified organolithium compounds, sec-butyl lithium, t-butyl lithium, lithium ethyl isobutylate, 1,3-bis(lithio-1,3-dimethylpentyl)benzene, 1,3-bis (lithiophenyl-3-methylpentyl)benzene and the like are preferred from the viewpoint of polymerization initiating ability.

The organoaluminum compound (I) to be used in the present invention is a compound represented by the above-described formula (I).

In the formula (I), as described above, $R^1$ represents a substituted or unsubstituted alkyl group having at least 3 carbon atoms, a substituted or unsubstituted alkoxy group having at least 3 carbon atoms or a substituted or unsubstituted aryloxy group. When $R^1$ represents a $C_1$ or $C_2$ alkyl group (methyl group or ethyl group), it becomes impossible to attain a high polymerization reaction rate and high living properties (high block efficiency upon the preparation of a block copolymer) at the same time, leading to a difficulty in the industrially advantageous preparation of a predetermined acrylic acid ester polymer having a high purity. $R^1$ may be $C_3$–$C_{20}$.

When $R^1$ represents a substituted or unsubstituted alkyl group having at least 3 carbon atoms, it is preferably a $C_{3-12}$ alkyl group from the viewpoints of polymerization activity of the organoaluminum compound (I), handling properties, easy preparation, availability and the like. Among the $C_{3-12}$ alkyl groups, $C_{3-10}$ alkyl groups such as n-propyl, isopropyl, n-butyl, isobutyl, sec-butyl, t-butyl, 2-methylbutyl, 3-methylbutyl, n-octyl, 2-ethylhexyl and the like are more preferred. Among the alkyl groups having at least 3 carbon atoms, branched alkyl groups having at least 3 carbon atoms or linear alkyl groups having at least 4 carbon atoms are preferred in consideration of the stability of the active end of the polymer in the polymerization system or attainment of high living properties (moreover, attainment of high block efficiency) and the like, of which branched $C_{3-12}$ alkyl groups or linear $C_{4-12}$ alkyl groups are more preferred, with branched $C_{3-10}$ alkyl groups such as isopropyl, isobutyl and 3-methylbutyl groups or linear $C_{6-10}$ alkyl groups such as n-hexyl and n-octyl groups being still more preferred. With all of the availability, handling properties, stabilizing ability of living end of the polymer, living properties, block efficiency and the like taken into account, isobutyl group is particularly preferred as $R^1$.

When $R^1$ represents a substituted or unsubstituted alkoxy group having at least 3 carbon atoms, examples of it include isopropoxy and t-butoxy groups.

When $R^1$ represents a substituted or unsubstituted aryloxy group, examples of it include unsubstituted aryloxy groups such as phenoxy, 2-methylphenoxy, 4-methylphenoxy, 2,6-dimethylphenoxy, 2,4-di-t-butylphenoxy, 2,6-di-t-butylphenoxy, 2,6-di-t-butyl-4-methylphenoxy, 2,6-diphenylphenoxy, 1-naphthoxy, 2-naphthoxy, 9-phenanothryloxy and 1-pyrenyloxy groups and substituted aryloxy groups such as 7-methoxy-2-naphthoxy group.

The substituted or unsubstituted alkyl group having at least 3 carbon atoms, substituted or unsubstituted alkoxy group having at least 3 carbon atoms, and substituted or unsubstituted aryloxy group represented by $R^1$ each has no substituent or at least one substituent. Examples of the substituent include alkoxy groups such as methoxy, ethoxy, isopropoxy and t-butoxy groups, and halogen atoms such as chlorine, bromine and fluorine.

In the formula (I), $R^2$ and $R^3$ each independently represents a substituted or unsubstituted aryloxy group or $R^2$ and $R^3$ may be bonded together to form a substituted or unsubstituted arylenedioxy group. $R^2$ and $R^3$ may be $C_6$–$C_{40}$.

Preferred examples of the substituted or unsubstituted aryloxy group as $R^2$ or $R^3$ include unsubstituted aryloxy groups such as phenoxy, 2-methylphenoxy, 4-methylphenoxy, 2,6-dimethylphenoxy, 2,4-di-t-butylphenoxy, 2,6-di-t-butylphenoxy, 2,6-di-t-butyl-4-methylphenoxy, 2,6-diphenylphenoxy, 1-naphthoxy, 2-naphthoxy, 9-phenantryloxy and 1-pyrenyloxy groups, and substituted aryloxy groups such as 7-methoxy-2-naphthoxy group. Preferred examples of the substituted or unsubstituted arylenedioxy group formed by the bonding of $R^2$ and $R^3$ include groups derived from 2,2'-diphenol, 2,2'-methylenebisphenol, 2,2'-methylenebis(4-methyl-6-t-butylphenol), (R)-(+)-1,1'-bi-2-naphthol and (S)-(–)-1,1'-bi-2-naphthol.

The substituted or unsubstituted aryloxy group as $R^2$ or $R^3$ and the substituted or unsubstituted arylenedioxy group formed by the bonding of $R^2$ and $R^3$ each has no substituent or at least one substituent. Examples of the substituent include alkoxy groups such as methoxy, ethoxy, isopropoxy and t-butoxy, and halogen atoms such as chlorine, bromine and fluorine.

When the organoaluminum compound (I) has two or three aryloxy groups which may have a substituent, these aryloxy groups may be the same or different in the chemical structure.

Typical examples of the organoaluminum compound (I) to be used in the present invention include isobutylbis(2,6-di-t-butyl-4-methylphenoxy)aluminum, isobutylbis(2,6-di-t-butylphenoxy)aluminum, isobutyl(2,2'-methylenebis(4-methyl-6-t-butylphenoxy))aluminum, n-octylbis(2,6-di-t-butyl-4-methylphenoxy)aluminum, n-octylbis(2,6-di-t-butylphenoxy)aluminum, n-octyl(2,2'-methylenebis(4-methyl- 6-t-butylphenoxy))aluminum, tris(2,6-di-t-butyl-4-methylphenoxy)aluminum and tris(2,6-diphenylphenoxy) aluminum. Among them, compounds having, in the formula (I), isobutyl or n-octyl group as $R^1$ and 2,6-di-t-butyl-4-methylphenoxy or 2,4-di-t-butylphenoxy group as each of $R^2$ and $R^3$, that is, isobutylbis(2,6-di-t-butyl-4-methylphenoxy)aluminum, isobutylbis(2,4-di-t-butylphenoxy)aluminum, n-octylbis(2,6-di-t-butyl-4-methylphenoxy)aluminum and n-octylbis(2,4-di-t-butylphenoxy)aluminum are particularly preferred from the viewpoints of polymerization activity, stabilizing ability of growing terminal (or living end) of the polymer, block efficiency and the like.

No particular limitation is imposed on the preparation process of the organoaluminum compound (I). The organoaluminum compound (I) having as $R^1$ a substituted or unsubstituted alkyl group having at least 3 carbon atoms or a substituted or unsubstituted aryloxy group can be prepared easily, for example, in a known technique, by reacting an aromatic compound having in the molecule thereof one or two phenolic hydroxyl groups and a trialkylaluminum at a predetermined proportion. The organoaluminum compound (I) having as $R^1$ a substituted or unsubstituted alkoxy group having at least 3 carbon atoms, on the other hand, can be prepared easily, for example, in a known technique, by reacting a tertiary organoaluminum compound having one alkyl group and two aryloxy groups (which may have a substituent) or having one alkyl group and one arylenedioxy group (which may have a substituent) with an alcohol having at least 3 carbon atoms at a substantially equal molar ratio.

Although there is no particular limitation imposed on the amount of the organolithium compound used in the anionic polymerization according to the present invention, it is preferred to use the organolithium compound in an amount ranging from 0.01 to 10 moles based on 100 moles, in total, of all the monomers used (for example, acrylic acid ester (a), (meth)acrylic monomer (b) and the like for the preparation of a block copolymer) from the viewpoint of smooth preparation of the target acrylic acid ester polymer.

The organolithium compound and the organoaluminum compound (I) can be used at a suitable ratio as needed, depending on the kind of polymerization process, the nature of a polymerization solvent in the case of solution polymerization or other various polymerization conditions. Generally, it is preferred to use the organoaluminum compound (I) in an amount of 1.0 mole or greater per mole of the organolithium compound, with 2.0 moles or greater being more preferred. The amount of the organoaluminum compound (I) used has no upper limit from the viewpoint of the polymerization reaction, however, from the viewpoints of a production cost, removal of the organoaluminum compound residue contained in the polymer and the like, it is preferred to suppress the amount of the organoaluminum compound (I) to 500 moles or less per mole of the organolithium compound, with 100 moles or less being more preferred.

There is no particular limitation imposed on the nature of the acrylic acid ester to be used in the present invention. Any acrylic acid ester formally composed of an acrylic acid component and an alcoholic component can be used, of which acrylic acid esters containing a $C_{1-15}$ alcoholic component are preferred. Preferred examples of the acrylic acid ester usable in the present invention include primary alkyl acrylates such as methyl acrylate, ethyl acrylate, n-propyl acrylate, n-butyl acrylate, isobutyl acrylate, 2-ethylhexyl acrylate, lauryl acrylate, cetyl acrylate and n-stearyl acrylate, glycidyl acrylate, allyl acrylate, 2-methoxyethyl acrylate, 3-methoxybutyl acrylate, trimethoxysilylpropyl acrylate, trifluoroethyl acrylate, isopropyl acrylate, sec-butyl acrylate, t-butyl acrylate, cyclohexyl acrylate, isobornyl acrylate, trimethylsilyl acrylate and the like. These acrylic acid esters may be used either singly or in combination. In the polymerization reaction according to the present invention, particularly marked effects are exhibited in the polymerization of a primary alkyl acrylate so that it is preferred that the acrylic acid ester to be used is mainly the primary alkyl acrylate.

In combination with the acrylic acid ester, another anionic polymerizable monomer can be used for copolymerization insofar as it does not take adverse effects for the desired polymerization. Typical examples of the anionic polymerizable monomer which can be used for copolymerization include methacrylic acid esters, methacrylamides, acrylamides and the like. Although there is no limitation imposed on the methacrylic acid ester usable for the copolymerization, typical examples include alkyl methacrylates such as methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, lauryl methacrylate, cetyl methacrylate and n-stearyl methacrylate; cycloalkyl methacrylates such as cyclohexyl methylacrylate and isobornyl methacrylate; aryl methacrylates such as phenyl methacrylate; aralkyl methacrylates such as benzyl methacrylate; glycidyl methacrylate; allyl methacrylate; trimethylsilyl methacrylate; trimethoxysilylpropyl methacrylate; 2-methoxyethyl methacrylate; 3-methoxybutyl methacrylate; trifluoroethyl methacrylate and the like. Although there is no particular limitation imposed on the methacrylamide usable in the present invention, preferred examples include primary methacrylamides such as N-methylmethacrylamide, N-ethylmethacrylamide, N-n-propylmethacrylamide, N-isopropylmethacrylamide, N-n-butylmethacrylamide, N-isobutylmethacrylamide, N-t-butylmethacrylamide, N-(2-ethylhexyl)methacrylamide, N-laurylmethacrylamide, N-cyclohexylmethacrylamide, N-phenylmethacrylamide, N-benzylmethacrylamide, N-trimethylsilylmethacrylamide and N-allylmethacrylamide; and secondary methacrylamides such as N,N-dimethylmethacrylamide, N,N-diethylmethacrylamide, N,N-di-n-propylmethacrylamide, N,N-diisopropylmethacrylamide, N,N-di-n-butylmethacrylamide, N,N-diisobutylmethacrylamide, N,N-di-t-butylmethacrylamide, N,N-bis(2-ethylhexyl)methacrylamide, N,N-dilaurylmethacrylamide, N,N-dicyclohexylmethacrylamide, N,N-diphenylmethacrylamide, N,N-dibenzylmethacrylamide, N,N-bis(trimethylsilyl)methacrylamide and N,N-diallylmethacrylamide. Although there is no particular limitation imposed on the acrylamide usable in the present invention, typical examples include primary acrylamides such as N-methylacrylamide, N-ethylacrylamide, N-n-propylacrylamide, N-isopropylacrylamide, N-n-butylacrylamide, N-isobutylacrylamide, N-t-butylacrylamide, N-(2-ethylhexyl)acrylamide, N-laurylacrylamide, N-cyclohexylacrylamide, N-phenylacrylamide, N-benzylacrylamide, N-trimethylsilylacrylamide and N-allylacrylamide; and secondary acrylamides such as N,N-dimethylacrylamide, N,N-diethylacrylamide, N,N-di-n-propylacrylamide, N,N-diisopropylacrylamide, N,N-di-n-butylacrylamide, N,N-diisobutylacrylamide, N,N-di-t-butylacrylamide, N,N-bis(2-ethylhexyl)acrylamide, N,N-dilaurylacrylamide, N,N-dicyclohexylacrylamide, N,N-diphenylacrylamide, N,N-dibenzylacrylamide, N,N-bis(trimethylsilyl)acrylamide and N,N-diallylacrylamide.

It is preferred to dry the monomer, such as acrylic acid ester, to be used in the present invention in advance under an inert gas stream or the like in order to allow the subsequent polymerization reaction to proceed smoothly. For drying, a dehydrating or drying agent such as calcium hydride, molecular sieves or activated alumina is preferably employed.

Upon preparation of the block copolymer (C), the acrylic acid ester as described above is used as the acrylic acid ester (a) for the formation of the polymer block (A). As a monomer for the formation of the polymer block (A), it is possible to use, in combination with the acrylic acid ester (a), another anionic polymerizable monomer, for example, a methacrylic acid ester such as fluoroethyl methacrylate, glycidyl methacrylate, allyl methacrylate, trimethylsilyl methacrylate or trimethoxysilylpropyl methacrylate in a small amount as needed. When another monomer is used, however, it is preferred to suppress the proportion of another monomer to 20 mole % or less based on the whole amount of monomer used for the preparation of the polymer block (A), with 10 mole % or less being more preferred.

Upon preparation of the block copolymer (C), there is no particular limitation imposed on the nature of the (meth) acrylic monomer (b) to be used for the formation of the polymer block (B) insofar as it has a chemical structure different from the acrylic acid ester (a) used for the formation of the polymer block (A) and at the same time, is an anionic polymerizable monomer having an acrylic structure ($CH_2$=CH—CO—) or methacrylic structure ($CH_2$=C($CH_3$)CO—). The (meth)acrylic monomer (b) embraces, for example, methacrylic acid esters, methacrylamides, acrylamides and acrylic acid esters having a chemical structure different from the acrylic acid ester (a) to be used in combination. As these methacrylic acid esters, methacrylamides, acrylamides and acrylic acid esters, those as exemplified above can be employed.

Upon preparation of the block copolymer (C), it is possible to use, as the acrylic acid ester (a) and (meth)acrylic monomer (b), one or more than one polymerizable monomer as described above, respectively. Among the above-described specific examples, use of a monomer selected from the group consisting of methyl methacrylate, ethyl acrylate, n-butyl acrylate, 2-ethylhexyl acrylate and N,N-diethylacrylamide is preferred from the viewpoints of polymerization activity, cost of raw materials, physical properties of the resulting block copolymer and the like.

Upon preparation of the block copolymer (C), the acrylic acid ester (a) and (meth)acrylic monomer (b) can be fed to the polymerization system in any one of the following processes (i) to (iii):

(i): a process to prepare the target block copolymer (C) by successively feeding the acrylic acid ester (a) and (meth) acrylic monomer (b) in any order, thereby polymerizing them.

(ii): a process to prepare the target block copolymer (C) by simultaneously feeding the acrylic acid ester (a) and (meth)acrylic monomer (b), thereby polymerizing them.

(iii): a process to prepare the target block copolymer (C) by using in combination successive feeding and simultaneous feeding of the acrylic acid ester (a) and (meth)acrylic monomer (b).

A more detailed description will subsequently be made herein about the above-described processes (i) to (iii). For simplification, a description will be made only about the case where polymerization is carried out using a monofiuctional polymerization initiator. It is possible to easily understand the polymerization using a bifunctional polymerization initiator on the analogy of the below-described descriptions.

The above-described process (i) comprises (1) a step of feeding one of the monomers, that is, the acrylic acid ester (a) and (meth)acrylic monomer (b), to a polymerization system and carrying out first-stage polymerization, thereby preparing a polymer (a living polymer having at one end of its main chain an active anion) composed of said monomer, and (2) a step of feeding the other monomer to the polymerization system to couple and polymerize said other monomer with the active anion end of the living polymer (second-stage polymerization), thereby preparing a block copolymer having a polymer block (A) (which may hereinafter be referred to as "Block A") and a polymer block (B) (which may hereinafter be referred to as "Block B").

The polymerization in accordance with the process (i) makes it possible to prepare a block copolymer which is composed of a various number of blocks and has Blocks A and Blocks B alternately bonded by feeding to the polymerization system the acrylic acid ester (a) and (meth)acrylic monomer (b) in any order alternately and selecting the feeding frequency (the number of the polymerization stages). Described specifically, a Block B-Block A diblock copolymer can be prepared by feeding the (meth)acrylic monomer (b) to the polymerization system, thereby forming its living polymer and then feeding the acrylic acid ester (a) to couple and polymerize it with the active anionic end of the living polymer. A Block A-Block B diblock copolymer can be prepared by feeding the polymerization system with the acrylic acid ester (a) and (meth)acrylic monomer (b) in the reverse order, that is, by feeding the acrylic acid ester (a) first and polymerizing it, and then feeding the (meth)acrylic monomer (b) and carrying out polymerization.

A triblock copolymer of Block B-Block A-Block B can be prepared by (1) feeding the polymerization system with the (meth)acrylic monomer (b) to form a living polymer thereof, (2) feeding the acrylic acid ester (a) to couple and polymerize it with the active anionic end of the living polymer to form a diblock copolymer (the living polymer having an active anionic end on the side of Block A) of Block B-Block A and (3) feeding the (meth)acrylic monomer (b) to couple and polymerize it with the active anionic end of said diblock copolymer. If the acrylic acid ester (a) and (meth)acrylic monomer (b) are fed to the polymerization system in the reverse order, a triblock copolymer of Block A-Block B-Block A can be prepared.

In the process (i), a tetrablock copolymer of Block A-Block B-Block A-Block B can be prepared by feeding the polymerization system with the acrylic acid ester (a) and (meth)acrylic monomer (b) successively (alternately) four times and carrying out polymerization in four stages. Similarly, block copolymers (pentablock copolymer or greater-block copolymers) having at least 5 blocks, in total, of Block A and Block B bonded alternately can be prepared in this manner.

The process (ii) makes use of a difference in the polymerization rate between the acrylic acid ester (a) and (meth) acrylic monomer (b). For example, the polymerization rate of the acrylic acid ester (a) is generally higher than that of the methacrylic acid ester so that even if they are fed to the polymerization system simultaneously, the polymerization of the acrylic acid ester (a) mainly occurs in the initial stage and a polymer (living polymer having an active anion at one end of its main chain) mainly composed of the acrylic acid ester (a) is formed. With a gradual decrease in the concentration of the acrylic acid ester (a) in the polymerization system, the coupling and polymerization of the methacrylic acid ester with the active anionic end of the resulting polymer are accelerated, resulting in the preparation of a block copolymer having a polymer block (Block A) composed mainly of the acrylic acid ester (a) and a polymer block (Block B) mainly composed of the methacrylic acid ester. In the process (ii), the methacrylic acid ester and acrylic acid ester (a) may be fed to the polymerization system simultaneously as a mixture or simultaneously without premixing.

In the process (ii), by the simultaneous feeding of the methacrylic acid ester and acrylic acid ester (a) to the polymerization system in one stage, a diblock copolymer (Block A-Block B) having one Block A and one Block B bonded each other is formed. In the process (ii), when the polymerization is carried out by the second simultaneous feeding of the methacrylic acid ester and acrylic acid ester (a) after the substantial completion of the polymerization by the first simultaneous feeding of the methacrylic acid ester and acrylic acid ester (a), a tetrablock copolymer of Block A-Block B-Block A-Block B can be prepared. In the process (ii), a hexablock or greater-block copolymer composed of Block A and Block B alternately and having at least 6 blocks bonded in total can be obtained by simultaneous feeding and polymerizing of the methacrylic acid ester and acrylic acid ester (a) at least three times.

The process (iii) comprises the combination of the above-described process (i) and process (ii). This process (iii) makes it possible to prepare a multiblock copolymer composed of Block A and Block B and having at least three blocks bonded in total. The adopting order and frequency of the process (i) and process (ii) can be determined as needed according to the chemical structure of the desired block copolymer.

Although there is no limitation to the process (iii), specific examples include the following processes (iii)-1 to (iii)-4.

(iii)-1: a process to prepare a triblock copolymer of Block B-Block A-Block B by (1) feeding the polymerization system with a methacrylic acid ester first, thereby forming its living polymer and (2) feeding the methacrylic acid ester and acrylic acid ester (a) simultaneously, thereby coupling and polymerizing mainly the acrylic acid ester (a), which has a higher polymerization rate, with the active anionic end of the resulting living polymer to form a diblock copolymer (living polymer having an active anion end on the side of Block A) of Block B-Block A, and then, coupling and polymerizing the methacrylic acid ester with the resulting diblock copolymer.

(iii)-2: a process to prepare a multiblock copolymer represented by the formula: Block B-Block A-(Block B-Block A)$_m$-Block B-Block A-Block B (wherein, m stands for 0 or an integer of 1 or greater) or the formula: Block A-(Block B-Block A)$_n$-Block B-Block A-Block B (wherein, n stands for 0 or an integer of 1 or greater) by (1) successively feeding the polymerization system with the methacrylic acid ester and acrylic acid ester (a) at desired frequency to form a multiblock copolymer which has an active anionic end at the methacrylic acid ester polymer block (Block B) and is represented by the formula: Block B-Block A-(Block B-Block A)$_m$-Block B* (wherein m stands for 0 or an integer of 1 or greater, * means an active anionic end) or the formula: Block A-(Block B-Block A)$_n$-Block B* (wherein n stands for 0 or an integer of 1 or greater, * means an active anionic end) and (2) simultaneously feeding the methacrylic acid ester and acrylic acid ester (a) to coupling and polymerizing mainly the acrylic acid ester (a) having a higher polymerization rate with the above-described active anionic end (*) of Block B and then coupling and polymerizing mainly the methacrylic acid ester.

(iii)-3: a process to prepare a triblock copolymer of Block A-Block B-Block A by (1) simultaneously feeding the methacrylic acid ester and acrylic acid ester (a) to the polymerization system, thereby polymerizing mainly the acrylic acid ester (a) having a higher polymerization rate to form an acrylic acid ester polymer having an active anionic end and then coupling and polymerizing mainly the methacrylic acid ester with the active anionic end to prepare a diblock copolymer (living polymer having an active anionic end on the side of Block B) of Block A-Block B and (2) feeding the acrylic acid ester (a) to couple and polymerize it with the active anionic end of the block B.

(iii)-4: a process to prepare a multiblock copolymer represented by the formula: Block A-Block B-Block A-Block B-(Block A-Block B)p-Block A (wherein p stands for 0 or an integer of 1 or greater) or the formula: Block A-Block B-Block A-(Block B-Block A)$_q$-Block B (wherein q stands for 0 or an integer of 1 or greater) by (1) simultaneously feeding a methacrylic acid ester and acrylic acid ester (a) to the polymerization system, thereby polymerizing mainly the acrylic acid ester (a) having a higher polymerization rate to form the corresponding acrylic acid ester polymer having an active anionic end and then coupling and polymerizing mainly the methacrylic acid ester with the active anionic end to form a diblock copolymer (living polymer having the active anionic end on the side of Block B) of Block A-Block B; and (2) feeding the acrylic acid ester (a) and methacrylic acid ester in any frequency in repetition in this order to cause successive polymerization.

Among the above-described processes (i) to (iii), the process (i), that is, a process for preparing a block copolymer by successively and alternately feeding to the polymerization system the acrylic acid ester (a) and (meth)acrylic acid monomer (b) in any order, thereby forming Block A and Block B alternately in this order or in the reverse order, makes it possible to prepare, without failure, a block copolymer having the predetermined number of Block A and Block B bonded alternately, each of said blocks being adjusted to a predetermined polymerization degree (molecular weight).

The polymerization reaction according to the present invention can be conducted without an organic solvent, but preferably conducted in an organic solvent, because the use of an organic solvent makes it possible to control the polymerization temperature, to make uniform the conditions in the polymerization system and to allow the polymerization to proceed smoothly. As an organic solvent, hydrocarbon solvents and/or halogenated hydrocarbon solvents are preferred, because they are relatively safe upon handling, are not easily mixed in the waste water, and can be easily collected and purified. Typical examples of the hydrocarbon solvent include benzene, toluene, xylene, cyclohexane, methylcyclohexane and the like; while those of the halogenated hydrocarbon solvent include chloroform, methylene chloride, carbon tetrachloride and the like. They may be used either singly or in combination. Among them, hydrocarbon solvents are more preferred. Prior to polymerization, the organic solvent to be employed is preferably purified by deaeration and dehydration.

The amount of the organic solvent used can be adjusted as needed depending on the chemical structure and polymerization degree of the target acrylic acid ester polymer, kind of monomers, kind of an organolithium compound, kind of an organoaluminum compound (I), kind of an organic solvent, kind of the polymerization process (for example, one of the above-described processes (i) to (iii)) and the like. From the viewpoints of smooth progress of polymerization, separability and availability of the resulting acrylic acid ester polymer, cost of waste water disposal and the like, an organic solvent is, in general, preferably used in an amount ranging from 200 to 3000 parts by weight based on 100 parts by weight of all the monomers employed, with an amount ranging from 300 to 2000 parts by weight being more preferred.

There is no particular limitation imposed on the adding method of the organolithium compound, organoaluminum compound (I) and monomer to the polymerization system. A suitable method can be adopted as needed depending on the polymerization process (for example, one of the above-described processes (i) to (iii)) to be adopted, kind of the target acrylic acid ester polymer (for example, the number of the polymer blocks) or the like. For example, the organolithium compound and organoaluminum compound (I) may be added to the polymerization system as they are or after both or either of them is dissolved in an organic solvent or the monomer. The monomer may be fed to the polymerization system as it is or after being dissolved in an organic solvent.

In the case of the polymerization on an industrial scale, it is sometimes preferred to carry out polymerization while feeding a monomer as it is or as a solution containing it, which facilitates the temperature control of the polymerization system. In this case, the monomer may be fed continuously or intermittently.

Concerning the contacting order of the organolithium compound, organoaluminum compound (I) and monomer at the beginning time of the polymerization, it is generally preferred to initiate polymerization by bringing the organolithium compound in contact with the organoaluminum compound (I) and then with the monomer; or by bringing the organolithium compound in contact with a portion of the organoaluminum compound (I) and then with a mixture comprising the monomer and the remaining portion of the organoaluminum compound (I). When the above-described order is adopted, the deactivating component in the monomer is inactivated by the action of the organoaluminum compound (I) and in addition, a complex is formed between the monomer and the organoaluminum compound (I), which makes it possible to improve the living properties (block efficiency in the case of block copolymerization) still more in the polymerization.

In the polymerization according to the present invention, it is possible to add other additives to the polymerization system as needed in accordance with a known technique. Examples include inorganic salts such as lithium chloride, alkoxide compounds such as lithium 2-(2-methoxyethoxy) ethoxide and potassium t-butoxide, and organic quaternary salts such as tetraethylammonium chloride and tetraethylphosphonium bromide.

The polymerization according to the present invention is preferably conducted in an inert gas atmosphere such as nitrogen, argon or helium. Polymerization is preferably carried out under thorough stirring conditions to homogenize the reaction system.

Concerning the polymerization temperature in the polymerization reaction according to the present invention, suitable conditions can be selected as needed, depending on the kind of the organolithium compound, kind of the organoaluminum compound (I), kind of the organic solvent, kind of the monomer to be polymerized or the details of the polymerization step. In general, in the polymerization step of the acrylic acid ester, low polymerization temperatures tend to suppress inconveniences such as a reduction in the polymerization initiating efficiency, a reduction in the living polymerizability and an increase in the molecular weight distribution (increase in the ununiformity of the molecular weight). Excessive low polymerization temperatures, however, are industrially disadvantageous because of an increase in the necessary amount of cooling utilities, a reduction in the polymerization rate and the like. Generally, a temperature within a range of from −100° C. to +100° C. is preferred, because in this case, an acrylic acid ester polymer having uniform molecular weight (polymerization degree) (in the case of a block copolymer, the block copolymer which is uniform in the molecular weight (polymerization degree) of each of the polymer blocks and the molecular weight of the whole block copolymer) can be prepared industrially advantageously in a high yield, while retaining high living polymerizability, with −80° C. to +60° C. being more preferred.

In the polymerization reaction according to the present invention, when the polymerization temperature is low, the resulting acrylic acid ester polymer tends to have improved stereoregularity so that even an acrylic acid ester polymer having crystallizability can be prepared. Since the acrylic acid ester polymer (particularly primary alkyl acrylate polymer) is generally a material excellent in flexibility, imparting the acrylic acid ester polymer with crystallizability makes it possible to provide a material having both excellent flexibility and excellent heat resistance or chemical resistance. In the case of block copolymerization, at a low polymerization temperature of the acrylic acid ester (a) upon formation of the polymer block (A), the resulting polymer block (A) tends to have improved stereoregularity, which makes it possible to prepare a block copolymer having the polymer block (A) with crystallizability, that is, a block copolymer with crystallizability. In the block copolymer having an acrylic acid ester polymer block, the acrylic acid ester polymer block contributes to the exhibition of flexibility (particularly, a primary alkyl acrylate polymer block makes a large contribution) so that it is possible to impart the block copolymer with excellent chemical resistance or high breaking strength by imparting the acrylic acid ester polymer block with crystallizability. The physical properties of the block copolymer with crystallizability differs largely with its melting point as a boundary and it is also possible to impart it with a desired thermal responsive function by making use of its crystallinity ratio, crystallization rate and crystallization temperature.

In order to prepare an acrylic acid ester polymer with crystallizability or block copolymer with crystallizability, it is preferred to adjust the polymerization temperature of the acrylic acid ester (in the case of block copolymerization, the polymerization temperature of the acrylic acid ester (a)) to −40° C. or less. Although there is no lower limit in the polymerization temperature from the viewpoint of the exhibition of crystallizability, it is preferred to adopt a temperature within a range of −100° C. to −40° C. in consideration of the anionic activity at a growing species end, polymerization rate, cooling cost or the like, with a range of −80° C. to −50° C. being more preferred. If the acrylic acid ester is polymerized at −40° C. or less as described above, the resulting crystalline acrylic acid ester polymer (in the case of block copolymerization, the resulting polymer block (A)) generally has a syndiotactic triad (rr) of at least 35%. If exhibition of higher crystallizability is desired, the syndiotacticity of the acrylic acid ester polymer (or syndiotacticity of the polymer block (A)) is preferably at least 40% in terms of syndiotactic triad (rr). The syndiotacticity of the acrylic acid ester polymer (in the case of the block copolymer (C), syndiotacticity of the polymer block (A)) is expressed by an area ratio of a peak around 64.35 ppm belonging to the syndiotactic triad (rr) relative to the sum of the areas of the peak belonging to syndiotactic triad (rr), a peak around 64.43 ppm belonging to heterotactic triad (rm) and a peak around 64.56 ppm belonging to isotactic triad (mm), each found by the $^{13}$C-NMR measurement of the polymer in the form of a solution of deuterated chloroform.

The crystallizability of the acrylic acid ester polymer (or block copolymer) can be confirmed by a known method such as measurement by DSC (differential scanning calorimeter), measurement by X-ray diffraction and observation through an optical microscope. In the confirmation through measurement by DSC, for example, the polymer is judged to have crystallizability when an endothermic peak (peak derived from melting of crystals) is observed upon heating at a rate of 10° C./min from −150° C. to +200° C. in a nitrogen gas stream and an exothermic peak (peak derived from crystallization) is observed upon temperature decrease at a rate of 10° C./min from +200° C. to −150° C.

Accordingly, the block copolymer (C) available by the process of the present invention embraces a block copolymer which comprises at least one polymer block (A) and at least one polymer block (B) and in differential scanning calorimetry, exhibits an endothermic peak during heating, a block copolymer which comprises at least one polymer block (A) and at least one polymer block (B), said polymer block (A) having stereoregularity of at least 35% as expressed in terms of a content of syndiotactic triads (rr).

When the block copolymer (C) is prepared, in the formation stage of the polymer block (B) after the beginning of the polymerization (that is, the stage of adding the (meth)acrylic monomer (b) to the growing end composed of the (meth)acrylic monomer (b)), suitable polymerization temperatures vary depending on the kind of the (meth)acrylic monomer (b) to be employed, however, a temperature within a range of −100° C. to +100° C. is preferred in order to attain both the high activity of the polymer end anion composed of the (meth)acrylic monomer (b) and a high polymerization rate, with a temperature within a range of from −60° C. to +60° C. being more preferred. In the initial stage of switchover from the formation reaction of the polymer block (A) to the polymerization of the (meth)acrylic monomer (b) (for example, the stage where the polymerization ratio of the acrylic acid ester (a) approaches 100% and the (meth)acrylic monomer (b) is added to the polymerization system)), the temperature of the polymerization system is preferably adjusted to 40° C. or less for heightening the block efficiency, with a temperature of 20° C. or less being more preferred. Although there is no lower limit in the temperature at the initial stage of the switchover, it is advantageous not to decrease the temperature to −100° C. or less, because excessively low temperature is industrially disadvantageous from the viewpoints of cooling cost, polymerization rate or the like.

Concerning the polymerization time, suitable time may be adopted as needed depending on the various conditions such as kind of monomer, kind of organic solvent, kind of organolithium compound, kind of organoaluminum compound (I), polymerization temperature, molecular weight of the target acrylic acid ester polymer, the concentration of the monomer in the organic solvent and the like. Too short a polymerization time increases the ratio of the unreacted monomer, while unnecessarily long polymerization time reduces the productivity, so that polymerization time within a range of several seconds to 100 hours is preferred. For the preparation of the block copolymer (C), unnecessarily long polymerization time for the formation of a polymer block tends to deactivate the growing anionic end of the resulting polymer. This deactivating tendency is particularly prominent in the polymer end composed of the acrylic acid ester (a). In the case of block copolymerization, it is particularly preferred to complete each polymerization step within a time which permits at least 90% of the conversion of the monomer but does not allow the deactivation of a polymer end anion as much as possible.

In the preparation of the acrylic acid ester polymer on an industrial scale, it is difficult to completely prevent the partial deactivation of a polymerization initiator, so that the acrylic acid ester polymer having a desired molecular weight cannot always be prepared even by polymerization in accordance with the present invention by using the polymerization initiator and monomer at a ratio stoichiometrically calculated based on the desired molecular weight. In order to industrially prepare an acrylic acid ester polymer having a predetermined average molecular weight with particularly high reproducibility, it is preferred to carry out polymerization in two stages as described below. Described specifically, an acrylic acid ester polymer having a desired molecular weight can be prepared with high reproducibility by polymerizing a smaller amount of a monomer than the necessary amount stoichiometrically calculated based on the amount of the polymerization initiator (organolithium compound), thereby forming its living polymer in the reaction system; and, polymerizing said additional amount of the monomer with the living polymer, after measuring the molecular weight of the living polymer, calculating the number of moles of the living polymer based on the molecular weight of the living polymer and amount of the monomer, and calculating the additional amount of the monomer based on the molecular weight and the number of moles of the living polymer and the desired molecular weight of the final target polymer.

In the present invention, it is possible to terminate polymerization by adding a polymerization terminator to the reaction mixture when the target acrylic acid ester polymer has been formed by the polymerization. Examples of the polymerization terminator include protic compounds such as methanol, acetic acid and a methanol solution of hydrochloric acid. Although no particular limitation is imposed on the amount of the polymerization terminator, it is preferred to use it in an amount within a range of from 1 to 100 moles per mole of the organolithium compound used as a polymerization initiator.

In the present invention, a so-called "star type" or "multiarm type" acrylic acid ester polymer can be prepared by adding a polyfunctional acrylic acid ester or methacrylic acid ester to the reaction system at a stage after the completion of all the predetermined polymerization reactions but before the addition of a polymerization terminator. It is also possible to add to the reaction system a functionalizing agent (for example, aldehyde, lactone or carbon dioxide) or a small amount of a functional group-containing anionic polymerizable monomer (for example, glycidyl methacrylate) at a stage after the completion of all the predetermined polymerization reactions but before the addition of a polymerization terminator. In this case, an acrylic acid ester polymer having at the end of the molecular chain a functional group such as hydroxyl, carboxyl or epoxy can be obtained. Polymerization in the presence of a monofunctional anionic polymerization initiator permits the preparation of an acrylic acid ester polymer having at one end thereof a functional group, while that in the presence of a bifunctional anionic polymerization initiator permits the preparation of an acrylic acid ester polymer having at both ends thereof functional groups.

If metal components derived from the organolithium compound or organoaluminum compound (I) remain in the acrylic acid ester polymer obtained by separation from the reaction mixture after the termination of polymerization, they happen to cause inconveniences such as deterioration in the physical properties (such as tackiness or adhesion force) and poor transparency (such as poor appearance or color development) of the acrylic acid ester polymer, or a material (for example, pressure sensitive adhesive or adhesive) or molded or formed product formed therefrom. According to the purpose of the acrylic acid ester polymer, it is therefore preferred to remove the metal compound derived from the organolithium compound and organoaluminum compound (I) after completion of the polymerization. For the removal of the metal compound, it is effective to subject the acrylic acid ester polymer to cleaning treatment such as washing treatment with an acidic aqueous solution or adsorption treatment using an ion exchange resin or the like as an adsorbent. The organoaluminum compound (I) is easily converted into aluminum hydroxide as a result of its reaction with moisture in the air, even after the termination of the polymerization. The aluminum hydroxide once formed cannot be removed easily, because it is sparingly soluble in either an acidic aqueous solution or an alkali aqueous solution. Accordingly, it is preferred to wash the acrylic acid ester polymer (also in the form of a reaction mixture) with an acidic aqueous solution as soon as possible after the termination of the polymerization, whereby metal components can be removed with high efficiency. Examples of the acidic aqueous solution include hydrochloric acid and respective aqueous solutions of sulfuric acid, nitric acid, acetic acid, propionic acid and citric acid.

There is no particular limitation imposed on the method for separating and obtaining the acrylic acid ester polymer from the reaction mixture after polymerization is terminated and any method in accordance with a known method can be adopted. Examples include a method of precipitating an acrylic acid ester polymer by pouring the reaction mixture into a poor solvent for the acrylic acid ester polymer and a method of obtaining an acrylic acid ester polymer by distilling off the solvent from the reaction mixture.

According to the process of the present invention, an acrylic acid ester polymer having any molecular weight can be prepared. Although the molecular weight of the available acrylic acid ester polymers range widely, a number average molecular weight of from 1000 to 1000000 is generally preferred from the viewpoints of handling properties, fluidity, compatibility with another polymer (for example, acrylic resin, poly(vinyl chloride) resin or fluororesin)), coating properties, adhesion properties, tackiness or the like of the acrylic acid ester polymer. The process of the present invention generally provides an acrylic acid ester polymer having a highly uniform molecular weight (that is, narrow molecular weight distribution) and its molecular weight distribution (Mw/Mn) is often 1.5 or less.

Upon preparation of the block copolymer (C) as a target acrylic acid ester polymer according to the present invention, no particular limitation is imposed on the number of polymer blocks, arrangement of polymer blocks, molecular weight and stereoregularity of each polymer block and molecular weight of the whole block copolymer. In order to prepare a block copolymer which can in particular exhibit properties as a thermoplastic elastomer, it is preferred to make the block copolymer with a triblock or higher block structure composed of at least one polymer block (A) and at least two polymer blocks (B). For preparing a block copolymer having excellent heat resistance, it is preferred to render the polymer block (B) to have stereoregularity of at least 70% as expressed in terms of a content of syndiotacticity triads, with 80% being more preferred. For this purpose, use mainly of a methacrylic acid ester as the (meth)acrylic monomer (b) is preferred. The stereoregularity of the polymer block (A) can be adjusted, as described above, by the polymerization temperature of the acrylic acid ester (a) and a content of syndiotacticity triads can be adjusted even to at least 35%.

In the preparation of the block copolymer (C), although the molecular weights of each polymer block and the whole block copolymer can be adjusted as needed depending on the using purpose or the like, the polymer block (A), the polymer block (B) and the whole block copolymer preferably have number average molecular weights ranging from 1000 to 1000000, 1000 to 1000000 and 3000 to 3000000, respectively from the viewpoints of moldability or formability, handling properties, mechanical properties, compatibility with another polymer (for example, acrylic resin, polyvinyl chloride resin, fluororesin or the like), fine dispersibility, adhesion properties, tackiness or the like of the resulting block copolymer. Concerning the block copolymer (C) available by the process of the present invention, although no particular limitation is imposed on the ratio (Mw/Mn) of the weight average molecular weight (Mw) to the number average molecular weight (Mn) of the whole block copolymer, the present invention makes it possible to prepare a block copolymer having an Mw/Mn ratio falling within a range of from 1.0 to 1.5 and thus having a highly uniform molecular weight distribution. Moreover, a block copolymer having an Mw/Mn ratio falling within a range of from 1.0 to 1.3 can also be prepared.

The acrylic acid ester polymer available by the process of the present invention is useful as a raw material for an adhesive, pressure-sensitive adhesive, paint, foam, cushioning medium, vibration damper, insulation, sealant, sealing material or the like or an additive, owing to its excellent transparency, chemical resistance, weather resistance, flexibility and handling properties. In addition, the acrylic acid ester polymer available by the process of the present invention can, when added to a thermoplastic resin, thermosetting resin or the like used for various molded or formed products in the electric or electronic field, automotive field or medical field, improve the impact resistance, coating properties, printability, weather resistance or the like of the resin. It is also usable as a compatibilizer between plural resins. When molded or formed, the acrylic acid ester polymer obtainable by the process according to the present invention can exhibit excellent mechanical properties owing to its uniform molecular weight distribution, while it can exhibit excellent moldability or formability when added to another thermoplastic resin. When the acrylic acid ester polymer which is available by the process of the present invention has a functional group at one end or both ends of its main chain, the polymer can be used as a raw material component for a polymer such as polyester, polyurethane, polyamide or polyimide. When the acrylic acid ester polymer available by the process of the present invention has a polymerizable vinyl group at one end or both ends of its main chain, the polymer can be used as a macromonomer or crosslinking agent.

The block copolymer (C) available by the process of the present invention is thermoplastic and excellent in moldability or formability and handling properties so that it can be subjected to various molding or forming processes such as melt processing, thermoforming and thermal processing typified by injection molding, extrusion, compression molding, cast molding, blow molding, flow casting, vacuum forming and the like. In addition, the block copolymer (C) has flexibility and elasticity and can permit exhibition of excellent mechanical properties, transparency, chemical resistance, weather resistance, heat resistance, printability, setting property, tackiness, adhesion properties or the like. The block copolymer (C) is therefore usable effectively as a molded or formed product, cushioning material or medium, insulation, acoustic insulation material, adhesive, pressure-sensitive adhesive, a modifier for improving the impact resistance or the like of a resin or a compatibilizer to improve the compatibility between plural resins.

Upon use of the acrylic acid ester polymer available by the process of the present invention for various purposes, a deterioration preventing agent such as antioxidant or ultraviolet absorber, a plasticizer, a stabilizer, a thickener, a resin such as a tackifier resin or oligomer, a colorant, a pigment or an extender may be added to the acrylic acid ester polymer.

In the present invention, as described above, since an acrylic acid ester such as a primary alkyl acrylate can be polymerized by anionic polymerization while attaining both a high polymerization rate and high living properties even without a solvent involving a problem in its handling properties, the corresponding acrylic acid ester polymer having a desired molecular weight and narrow molecular weight distribution can be prepared with good reproducibility, smoothly and industrially advantageously. In the present invention, if an acrylic acid ester and another acrylic or methacrylic monomer (for example, a methacrylic acid ester) different in the chemical structure are used as monomers, the monomers can be block-copolymerized at high block efficiency even without a solvent involving a problem in handling properties, whereby the corresponding block copolymer can be prepared safely, smoothly and industrially advantageously.

EXAMPLES

Having generally described this invention, a further understanding can be obtained by reference to certain specific examples which are provided herein for purposes of illustration only and are not intended to be limiting unless otherwise specified.

Referential Example 1

Preparation of an Organoaluminum Compound (I): Isobutylbis(2,6-di-t-butyl-4-methylphenoxy)aluminum In a flask having an internal volume of 200 ml and an internal atmosphere purged with nitrogen, 34 ml of dry toluene obtained by drying over sodium and distilling under a nitrogen atmosphere and 11.02 g of 2,6-di-t-butyl-4-methylphenol were charged, followed by dissolution while stirring at room temperature. To the resulting solution, 6.31 ml of triisobutylaluminum was added. The resulting mixture was stirred at 80° C. for about 18 hours, whereby a toluene solution containing 0.5 mol/l of the intended organoaluminum compound (I) (isobutylbis(2,6-di-t-butyl-4-methylphenoxy)aluminum) was prepared.

Referential Example 2

Preparation of an Organoaluminum Compound (I): n-Octylbis(2,6-di-t-butyl-4-methylphenoxy)aluminum In a flask having an internal volume of 200 ml and an internal atmosphere purged with argon, 31 ml of dry toluene obtained by drying over sodium and distilling under an argon atmosphere and 11.02 g of 2,6-di-t-butyl-4-methylphenol were charged, followed by dissolution while stirring at room temperature. To the resulting solution, 9.17 g of tri-n-octylaluminum was added. The resulting mixture was stirred at 80° C. for about 18 hours, whereby a toluene solution containing 0.5 mol/l of the intended organoaluminum compound (I) (n-octylbis(2,6-di-t-butyl-4-methylphenoxy)aluminum) was prepared.

Referential Example 3
Preparation of an Organoaluminum Compound: Ethylbis(2,6-di-t-butyl-4-methylphenoxy)aluminum In a flask having an internal volume of 200 ml and an internal atmosphere purged with argon, 36 ml of dry toluene obtained by drying over sodium and distilling under an argon atmosphere and 11.02 g of 2,6-di-t-butyl-4-methylphenol were charged, followed by dissolution while stirring at room temperature. To the resulting solution, 3.42 ml of triethylaluminum was added. The resulting mixture was stirred at 80° C. for about 18 hours, whereby a toluene solution containing 0.5 mol/l of the intended organoaluminum compound (ethylbis(2,6-di-t-butyl-4-methylphenoxy)aluminum) was prepared.

Referential Example 4
Preparation of an Organoaluminum Compound: Diisobutyl (2,6-di-t-butyl-4-methylphenoxy)aluminum In a flask having an internal volume of 200 ml and an internal atmosphere purged with nitrogen, 39 ml of dry toluene obtained by drying over sodium and distilling under a nitrogen atmosphere and 5.51 g of 2,6-di-t-butyl-4-methylphenol were charged, followed by dissolution while stirring at room temperature. To the resulting solution 6.31 ml of triisobutylaluminum was added. The resulting mixture was stirred at 80° C. for about 18 hours, whereby a toluene solution containing 0.5 mol/l of the intended organoaluminum compound (diisobutyl(2,6-di-t-butyl-4-methylphenoxy)aluminum) was prepared.

Referential Example 5
Preparation of an Organoaluminum Compound: Methylbis (2,6-di-t-butyl-4-methylphenoxy)aluminum In a flask having an internal volume of 200 ml and an internal atmosphere purged with argon, 37 ml of dry toluene obtained by drying over sodium and distilling under an argon atmosphere and 11.02 g of 2,6-di-t-butyl-4-methylphenol were charged, followed by dissolution while stirring at room temperature. To the resulting solution, 2.40 ml of trimethylaluminum was added. The resulting mixture was stirred at 80° C. for about 18 hours, whereby a toluene solution containing 0.5 mol/l of the intended organoaluminum compound (methylbis(2,6-di-t-butyl-4-methylphenoxy)aluminum) was prepared.

Referential Example 6
Preparation of an Organoaluminum Compound (I): tris(2,6-diphenylphenoxy)aluminum In a flask having an internal volume of 200 ml and an internal atmosphere purged with argon, 30 ml of dry methylene chloride obtained by drying by molecular sieves and distilling under an argon atmosphere and 4.43 g of 2,6-diphenylphenol were charged, followed by dissolution while stirring at room temperature. To the resulting solution, 6.0 ml of a hexane solution (concentration: 1.0 moll) of trimethylaluminum was added. The resulting mixture was stirred at 80° C. for about 18 hours, whereby a solution containing 0.17 mol/l of the intended organoaluminum compound (I) (tris(2,6-diphenylphenoxy)aluminum) was prepared.

Example 1
Preparation of Crystalline Poly(n-butyl Acrylate) by Using Isobutylbis(2,6-di-t-butyl-4-methylphenoxy)aluminum In a Schlenk's tube having an internal volume of 120 ml and an internal atmosphere purged with argon, 14 ml of dry toluene was charged. After cooling to −78° C., 3.76 ml of a toluene solution (concentration: 0.5 mol/l) of the organoaluminum compound (I) (isobutylbis(2,6-di-t-butyl-4-methylphenoxy)aluminum) prepared in a similar manner to Referential Example 1, was added. To the resulting mixture, 0.12 ml of a pentane solution (concentration: 1.6 mol/l) of t-butyl lithium was added, followed by stirring. To the reaction mixture, 1.9 g of n-butyl acrylate was added. After the resulting mixture was polymerized for 10 minutes, about 0.02 ml of methanol was added thereto to terminate the polymerization.

A portion of the resulting solution was sampled and dissolved in deuterated chloroform. As a result of $^1$H-NMR measurement of the resulting solution, no peak derived from the n-butyl acrylate monomer was observed, indicating that the polymerization ratio of n-butyl acrylate was at least 98%.

The remaining portion of the resulting solution was poured into methanol and the white precipitate so formed was collected. The precipitate was dissolved in tetrahydrofuran. As a result of measurement by gel permeation chromatography (hereinafter be referred to as "GPC") of the resulting solution, poly(n-butyl acrylate) so obtained exhibited a single peak, had a number-average molecular weight (Mn) of 11600 in terms of polystyrene and had a molecular weight distribution (Mw/Mn) of 1.08. In addition, as a result of analysis of the poly(n-butyl acrylate) by $^{13}$C-NMR, it had a 55% content of syndiotactic triads (rr). By the DSC measurement of the poly(n-butyl acrylate), an endothermic peak was confirmed at 52° C. while spherulites were confirmed by the observation through an optical microscope (the crystals were melted by heating to about 70° C.). Based on the above findings, it was therefore confirmed that the poly(n-butyl acrylate) had crystallizability.

Comparative Example 1
Preparation of Poly(n-butyl Acrylate) by Using Ethylbis(2,6-di-t-butyl-4-methylphenoxy)aluminum In a similar manner to Example 1 except that the toluene solution of an organoaluminum compound was replaced by 3.76 ml of a toluene solution (concentration: 0.5 mol/l) of an organoaluminum compound (ethylbis(2,6-di-t-butyl-4-methylphenoxy)aluminum) prepared in a similar manner to Referential Example 3, polymerization was conducted and then terminated.

A portion of the resulting solution was sampled and dissolved in deuterated chloroform. As a result of $^1$H-NMR measurement of the resulting solution, it was found that the polymerization ratio of n-butyl acrylate was only about 4%.

Comparative Example 2
Preparation of Poly(n-butyl Acrylate) by Using Ethylbis(2,6-di-t-butyl-4-methyiphenoxy)aluminum In a similar manner to Example 1 except that the toluene solution of an organoaluminum compound was replaced by 3.76 ml of a toluene solution (concentration: 0.5 mol/l) of an organoaluminum compound (ethylbis(2,6-di-t-butyl-4-methylphenoxy)aluminum) prepared in a similar manner to Referential Example 3 and polymerization time was changed from 10 minutes to 1 hour, polymerization was conducted and then terminated.

A portion of the resulting solution was sampled and dissolved in deuterated chloroform. As a result of $^1$H-NMR measurement of the resulting solution, it was found that the polymerization ratio of n-butyl acrylate was about 21%.

Comparative Example 3
Preparation of Crystalline Poly(n-butyl Acrylate) by Using Ethylbis(2,6-di-t-butyl-4-methylphenoxy)aluminum In a similar manner to Example 1 except that the toluene solution of an organoaluminum compound was replaced by 3.76 ml of a toluene solution (concentration: 0.5 mol/l) of an organoaluminum compound (ethylbis(2,6-di-t-butyl-4-methylphenoxy)aluminum) prepared in a similar manner to Referential Example 3 and polymerization time was changed from 10 minutes to 22 hours, polymerization was conducted and then terminated.

A portion of the resulting solution was sampled and dissolved in deuterated chloroform. As a result of $^1$H-NMR measurement of the resulting solution, it was found that the polymerization ratio of n-butyl acrylate was 98% or greater.

The remaining portion of the solution was poured into methanol and the white precipitate so formed was collected. The precipitate was dissolved in tetrahydrofuran, followed by GPC measurement. As a result, it was found that the resulting poly(n-butyl acrylate) exhibited a single peak, had a number-average molecular weight (Mn) of 11200 in terms of polystyrene and had a molecular weight distribution (Mw/Mn) of 1.26. In addition, by the DSC measurement of the resulting poly(n-butyl acrylate), an endothermic peak was confirmed at 50° C. while spherulites were confirmed by the observation through an optical microscope (the crystals were melted by heating to about 70° C.). Based on the above findings, it was confirmed that the resulting poly(n-butyl acrylate) had crystallizability.

Comparative Example 4
Preparation of Poly(n-butyl Acrylate) by Using Diisobutyl (2,6-di-t-butyl-4-methylphenoxy)aluminum In a similar manner to Example 1 except that temperature was changed from –78° C. to –30° C.; the toluene solution of an organoaluminum compound was replaced by 3.76 ml of a toluene solution (concentration: 0.5 mol/l) of an organoaluminum compound (diisobutyl(2,6-di-t-butyl-4-methylphenoxy)aluminum) prepared in a similar manner to Referential Example 4; and polymerization time was changed from 10 minutes to 24 hours, polymerization was conducted and then terminated.

A portion of the resulting solution was sampled and dissolved in deuterated chloroform. As a result of $^1$H-NMR measurement of the resulting solution, it was found that n-butyl acrylate was hardly polymerized and the polymerization ratio of n-butyl acrylate was 3% or less.

Comparative Example 5
Preparation of Poly(n-butyl Acrylate) by Using Methylbis (2,6-di-t-butyl-4-methylphenoxy)aluminum In a similar manner to Example 1 except that the toluene solution of an organoaluminum compound was replaced by 3.76 ml of a toluene solution (concentration: 0.5 mol/l) of an organoaluminum compound (methylbis(2,6-di-t-butyl-4-methylphenoxy)aluminum) prepared in a similar manner to Referential Example 5; polymerization temperature was changed from –78° C. to –60° C.; and polymerization time was changed from 10 minutes to 24 hours, polymerization was conducted and then terminated.

A portion of the resulting solution was sampled and dissolved in deuterated chloroform. As a result of $^1$H-NMR measurement of the resulting solution, it was found that the polymerization ratio of n-butyl acrylate was 68%.

The remaining portion of the solution was poured into methanol and the white precipitate so formed was collected. The precipitate was dissolved in tetrahydrofuran, followed by GPC measurement. As a result, it was found that the resulting poly(n-butyl acrylate) exhibited a single peak, had a number-average molecular weight (Mn) of 10500 in terms of polystyrene and had a molecular weight distribution (Mw/Mn) of 1.72.

Example 2
Preparation of Amorphous Poly(n-butyl Acrylate) by Using Isobutylbis(2,6-di-t-butyl-4-methylphenoxy)aluminum In a similar manner to Example 1 except that the temperature was changed from –78° C. to –30° C., polymerization was conducted and then terminated.

A portion of the resulting solution was sampled and dissolved in deuterated chloroform. As a result of $^1$H-NMR measurement of the resulting solution, no peak derived from the n-butyl acrylate monomer was observed, indicating that the polymerization ratio of n-butyl acrylate was 98% or greater.

The remaining portion of the solution was poured into methanol to cause precipitation. The resulting white precipitate was dissolved in tetrahydrofuran, followed by GPC measurement. As a result, it was found that the resulting poly(n-butyl acrylate) exhibited a single peak, had a number-average molecular weight (Mn) of 17700 in terms of polystyrene and had a molecular weight distribution (Mw/Mn) of 1.15. In addition, as a result of $^{13}$C-NMR analysis of the poly(n-butyl acrylate), the polymer was found to have a 33% content of syndiotactic triad (rr). By DSC measurement of the poly(n-butyl acrylate), no endothermic peak was observed so that the polymer was found to be amorphous.

Example 3
Preparation of Amorphous Poly(n-butyl Acrylate) by Using n-Octylbis(2,6-di-t-butyl-4-methylphenoxy)aluminum In a similar manner to Example 1 except that the temperature was changed from –78° C. to –30° C.; and the toluene solution of an organoaluminum compound was replaced by 3.76 ml of a toluene solution (concentration: 0.5 mol/l) of an organoaluminum compound (I) (n-octyl(2,6-di-t-butyl-4-methylphenoxy)aluminum) prepared in a similar manner to Referential Example 2, polymerization was conducted and then terminated.

A portion of the resulting solution was sampled and dissolved in deuterated chloroform. As a result of $^1$H-NMR measurement of the resulting solution, no peak derived from the n-butyl acrylate monomer was observed, indicating that the polymerization ratio of n-butyl acrylate was 98% or greater.

The remaining portion of the solution was poured into methanol to cause precipitation. The resulting white precipitate was dissolved in tetrahydrofuran, followed by GPC measurement. As a result, it was found that the resulting poly(n-butyl acrylate) exhibited a single peak, had a number-average molecular weight (Mn) of 21000 in terms of polystyrene and had a molecular weight distribution (Mw/Mn) of 1.13. In addition, as a result of $^{13}$C -NMR analysis of the poly(n-butyl acrylate), the polymer was found to have a 36% content of syndiotactic triads (rr). By DSC measurement of the poly(n-butyl acrylate), no endothermic peak was observed so that the polymer was found to be amorphous.

Example 4
Preparation of Poly(2-ethylhexyl Acrylate) by Using Isobutylbis(2,6-di-t-butyl-4-methylphenoxy)aluminum (Including Washing Treatment)

In a similar manner to Example 1 except that the temperature was changed from –78° C. to –30° C.; a monomer employed was changed from n-butyl acrylate to 2-ethylhexyl acrylate (amount used: 1.9 g); and polymerization time was changed from 10 minutes to 3 hours, polymerization was conducted and then terminated.

To the resulting solution, 10 ml of 1N dilute sulfuric acid was added, followed by stirring. The reaction mixture was separated and an organic layer was collected. The organic layer thus collected was subjected to a series of washing operation five times, said operation comprising addition of water (10 ml), stirring, separation and removal of the water layer.

The solution after the above-described operation was poured into methanol to cause precipitation. The resulting white precipitate was collected and vacuum dried, whereby the solvent was removed completely. The poly(2-ethylhexyl acrylate) thus obtained was a colorless transparent liquid substance and contained substantially no metal components. The yield of the collected poly(2-ethylhexyl acrylate) was 97%, revealing that the polymerization proceeded substantially stoichiometrically. The poly(2-ethylhexyl acrylate) was dissolved in tetrahydrofuran, followed by GPC measurement. As a result, it was found that the resulting poly (2-ethylhexyl acrylate) exhibited a single peak, had a number-average molecular weight (Mn) of 11600 in terms of polystyrene and had a molecular weight distribution (Mw/Mn) of 1.14.

The results obtained in Examples 1 to 4 and Comparative Examples 1 to 5 and also main polymerization conditions employed are shown in Table 1.

Examples 1 to 5, which are different in the chemical structure of the organoaluminum compound from the present invention, a high polymerization ratio requires long polymerization time. It has also been found that the acrylic acid ester polymer obtained in each of Comparative Examples 3 and 5 tends to be a little inferior in the uniformity of the molecular weight distribution to that obtained according to the present invention.

Example 5
Preparation of Poly(n-butyl Acrylate) by Two-stage Polymerization Operation Using Isobutylbis(2,6-di-t-butyl-4-methylphenoxy)aluminum (1) In a Schlenk's tube having an internal volume of 120 ml and an internal atmosphere purged with argon, 64 ml of dry toluene was charged. After cooling to −30° C., 3.76 ml of a toluene solution (concentration: 0.5 mol/l) of the organoaluminum compound (I) (isobutylbis(2,6-di-t-butyl-4-methylphenoxy)aluminum) prepared in a similar manner to Referential Example 1 was added. To the resulting mixture, 0.12 ml of a pentane solution (concentration: 1.6 mol/l) of t-butyl lithium was added, followed by stirring. To the reaction mixture, 1.9 g of n-butyl acrylate was added. The resulting mixture was polymerized for 10 minutes.

TABLE 1

| | Polymerization conditions | | | | | Results of polymerization | | |
| --- | --- | --- | --- | --- | --- | --- | --- | --- |
| | Organo-aluminum compound | Organo-lithium compound | Acrylic acid ester | Polymerization Temp. | Polymerization time | Polymerization ratio | Molecular wt. of polymer | | Properties of polymer |
| | | | | | | | Mn | Mw/Mn | |
| Ex. 1 | iBAl(BHT)2 | t-BuLi | nBA | −78° C. | 10 min | ≧98% | 11600 | 1.08 | crystalline (rr = 55%) |
| Ex. 2 | iBAl(BHT)2 | t-BuLi | nBA | −30° C. | 10 min | ≧98% | 17700 | 1.15 | amorphous (rr = 33%) |
| Ex. 3 | nOAl(BHT)2 | t-BuLi | nBA | −30° C. | 10 min | ≧98% | 21000 | 1.13 | amorphous (rr = 36%) |
| Ex. 4 | iBAl(BHT)2 | t-BuLi | 2-EHA | −30° C. | 3 hours | 97% | 11600 | 1.14 | colorless, transparent liquid |
| Comp. Ex. 1 | EtAl(BHT)2 | t-BuLi | nBA | −78° C. | 10 min | 4% | — | — | — |
| Comp. Ex. 2 | EtAl(BHT)2 | t-BuLi | nBA | −78° C. | 1 hour | 21% | — | — | — |
| Comp. Ex. 3 | EtAl(BHT)2 | t-BuLi | nBA | −78° C. | 22 hours | ≧98% | 11200 | 1.26 | crystalline (rr = 53%) |
| Comp. Ex. 4 | iB2Al(BHT) | t-BuLi | nBA | −30° C. | 24 hours | ≦3% | — | — | — |
| Comp. Ex. 5 | MeAl(BHT)2 | t-BuLi | nBA | −60° C. | 24 hours | 68% | 10500 | 1.72 | — |

Abbreviations in Table 1 have the following meanings.
iBAl(BHT)2: isobutylbis(2,6-di-t-butyl-4-methylphenoxy)aluminum
nOAl(BHT)2: n-octylbis(2,6-di-t-butyl-4-methylphenoxy)aluminum
EtAl(BHT)2: ethylbis(2,6-di-t-butyl-4-methylphenoxy)aluminum
MeAl(BHT)2: methylbis(2,6-di-t-butyl-4-methylphenoxy)aluminum
i-B2Al(BHT): diisobutyl(2,6-di-t-butyl-4-methylphenoxy)aluminum
t-BuLi: t-butyl lithium
nBA: n-butyl acrylate
2-EHA: 2-ethylhexyl acrylate From Table 1, it has been understood that in the preparation examples of an acrylic acid ester polymer in Examples 1 to 4, according to the present invention, a polymer having a uniform molecular weight distribution can be prepared at a high polymerization ratio even in a relatively short polymerization time. It has also been found that at a relatively low polymerization temperature (Example 1), an acrylic acid ester polymer having crystallizability can be prepared.

It was found, on the other hand, that in the preparation examples of an acrylic acid ester polymer in Comparative A portion of the resulting solution was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%. The sample was poured into methanol and the white precipitate so formed was collected and dissolved in tetrahydrofuran. As a result of measurement by GPC of the resulting solution, it was found that the poly(n-butyl acrylate) thus obtained exhibited a single peak, had a number-average molecular weight (Mn) of 18800 in terms of polystyrene and had a molecular weight distribution (Mw/Mn) of 1.16.

(2) After the remaining portion of the solution was retained for one hour at −30° C. under stirring, 5.7 g of n-butyl acrylate was added further and the resulting mixture was polymerized at −30° C. for 3 hours. The polymerization was then terminated by the addition of about 0.02 ml of methanol.

A portion of the resulting solution was sampled and dissolved in deuterated chloroform. As a result of $^1$H-NMR measurement of the resulting solution, it was found that the polymerization ratio of the additional n-butyl acrylate was about 45%.

The remaining portion of the solution was poured into methanol and the white precipitate so formed was collected and dissolved in tetrahydrofuran. As a result of measurement by GPC of the resulting solution, it was found that the poly(n-butyl acrylate) thus obtained exhibited a peak having a slight shoulder part on the low-molecular weight side, had a number-average molecular weight (Mn) of 27800 in terms of polystyrene and had a molecular weight distribution (Mw/Mn) of 1.60. The GPC chart of the poly(n-butyl acrylate) thus obtained is shown in FIG. 1.

Comparative Example 6
Preparation of Poly(n-butyl Acrylate) by Two-stage Polymerization Operation Using Ethylbis(2,6-di-t-butyl-4-methylphenoxy)aluminum (1) In a similar manner to the step (1) of Example 5 except that the toluene solution of an organoaluminum compound was replaced by 3.76 ml of a toluene solution (concentration: 0.5 mol/l) of an organoaluminum compound (ethylbis(2,6-di-t-butyl-4-methylphenoxy)aluminum) which had been prepared in a similar manner to Referential Example 3, the first-stage polymerization was carried out.

A portion of the resulting solution was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%. The sample was poured into methanol and the white precipitate so formed was collected and dissolved in tetrahydrofuran. As a result of measurement by GPC of the resulting solution, it was found that the poly(n-butyl acrylate) thus obtained exhibited a peak having a shoulder part on the lower molecular weight side, had a number average molecular weight (Mn) of 19000 in terms of polystyrene and had a molecular weight distribution (Mw/Mn) of 1.35.

(2) After the remaining portion of the solution was retained for one hour at −30° C. under stirring, 5.7 g of n-butyl acrylate was added further and the resulting mixture was polymerized at −30° C. for 3 hours. The polymerization was then terminated by the addition of about 0.02 ml of methanol.

A portion of the resulting solution was sampled and dissolved in deuterated chloroform. As a result of $^1$H-NMR measurement of the resulting solution, it was found that the polymerization ratio of the additional n-butyl acrylate was about 42%.

Figure 2:
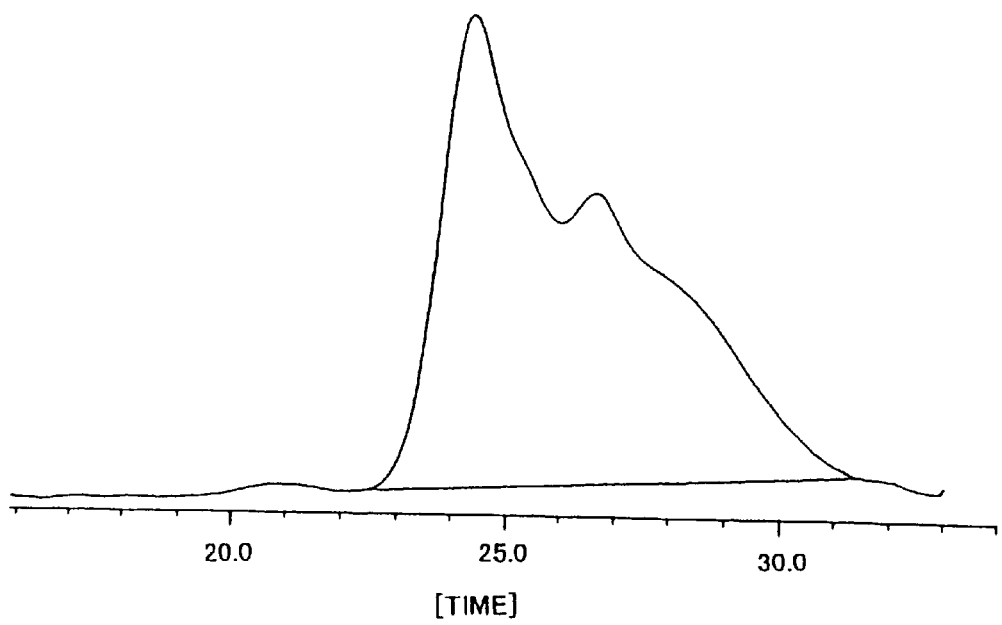
FIG. 2 is a GPC chart of poly(n-butyl acrylate) obtained as a final product in Comparative Example 6 not according to the present invention, drawn with the efflux time as abscissa.

The remaining portion of the solution was poured into methanol and the white precipitate so formed was collected and dissolved in tetrahydrofuran. As a result of measurement by GPC of the resulting solution, the poly(n-butyl acrylate) thus obtained exhibited double peaks, had a number-average molecular weight (Mn) of 27300 in terms of polystyrene and had a molecular weight distribution (Mw/Mn) of 1.96, indicating that a polymer having a uniformly controlled molecular weight distribution was not obtained. The GPC chart of the poly(n-butyl acrylate) thus obtained is shown in FIG. 2. On the low molecular weight side, there exists a peak corresponding to the poly(n-butyl acrylate) obtained by the first-stage polymerization in the step (1), indicating that the amount of deactivation of the living polymer (poly(n-butyl acrylate)). which had been formed by the first-stage polymerization, occurring until the beginning of the second-stage polymerization, is not negligible.

From the comparison between the preparation example of the acrylic acid ester polymer in Example 5, according to the present invention, and that of the acrylic acid ester polymer in Comparative Example 6, differing from the present invention in the chemical structure of the organoaluminum compound employed, it becomes apparent that because of high living properties (which means a long life of the anionic active end of the living polymer in the reaction system), the polymerization reaction according to the present invention is suited to the two-stage polymerization.

Example 6
Preparation of Poly(n-butyl Acrylate) by Continuous Monomer Feeding Polymerization Process by Using Isobutylbis(2,6-di-t-butyl-4-methylphenoxy)aluminum In an autoclave having an internal volume of 10 liters and an internal atmosphere purged with argon, 3.5 liters of dry toluene was charged, followed by the addition of 230 ml of a toluene solution (concentration: 0.5 mol/l) of an organoaluminum compound (I) (isobutylbis(2,6-di-t-butyl-4-methylphenoxy)aluminum) prepared in a similar manner to Referential Example 1. The resulting solution was cooled to −30° C. on a cooling bath of −35° C. Then, 6.5 ml of a pentane solution (concentration: 1.6 mol/l) of t-butyl lithium was added, followed by stirring for 20 minutes. While stirring the resulting solution, 300 g of n-butyl acrylate was added at a rate of 10 ml/min (time required for addition: 33 minutes). After the completion of the addition, stirring was continued for further 10 minutes, whereby polymerization was effected. Just after the addition of n-butyl acrylate was started, the internal temperature showed an increase and during the polymerization, the temperature increased to −24° C. at the maximum. To the reaction system, 30 ml of methanol was added to terminate the reaction.

A portion of the resulting solution was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%.

Figure 3:
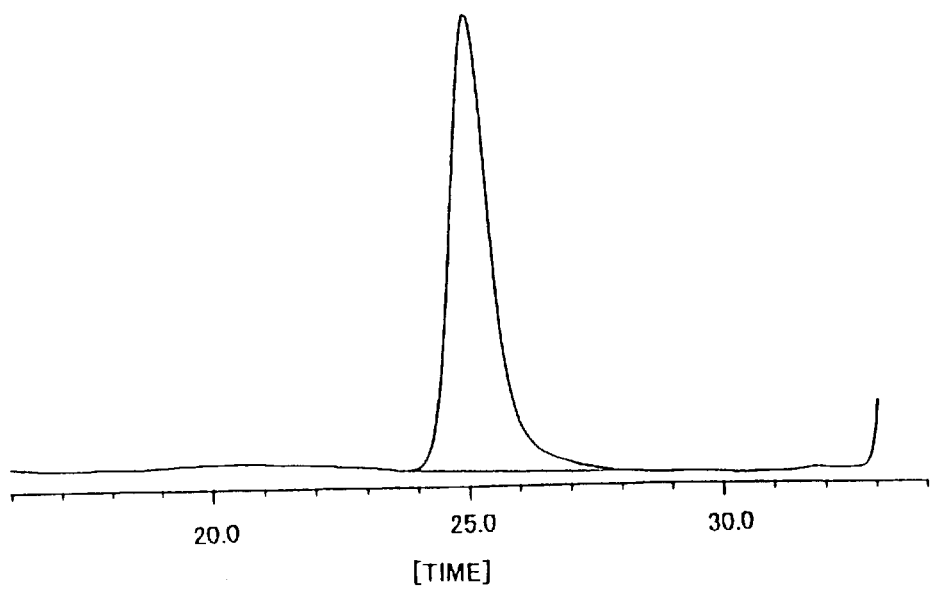
FIG. 3 is a GPC chart of poly(n-butyl acrylate) obtained as a final product in Example 6 according to the present invention, drawn with the efflux time as abscissa.

The sample was poured into methanol and the white precipitate so formed was collected and dissolved in tetrahydrofuran. As a result of measurement by GPC of the resulting solution, it was found that the poly(n-butyl acrylate) thus obtained exhibited a single peak, had a number-average molecular weight (Mn) of 49400 in terms of polystyrene and had a molecular weight distribution (Mw/Mn) of 1.05. The GPC chart of the poly(n-butyl acrylate) so obtained is shown in FIG. 3. The GPC chart has revealed that components having a molecular weight as low as 10000 or less were not present.

Comparative Example 7
Preparation of Poly(n-butyl Acrylate) by Continuous Monomer Feeding Polymerization Process by Using Ethylbis(2, 6-di-t-butyl-4-methylphenoxy)aluminum In a similar manner to Example 6 except that the toluene solution of an organoaluminum compound was replaced by 230 ml of a toluene solution (concentration: 0.5 mol/l) of an organoaluminum compound (ethylbis(2,6-di-t-butyl-4-methylphenoxy)aluminum) prepared in a similar manner to Referential Example 3, the polymerization was conducted and then terminated. Just after the addition of n-butyl acrylate was started, the internal temperature showed an increase and during the polymerization, it increased to 27° C. at the maximum.

A portion of the resulting solution was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%.

Figure 4:
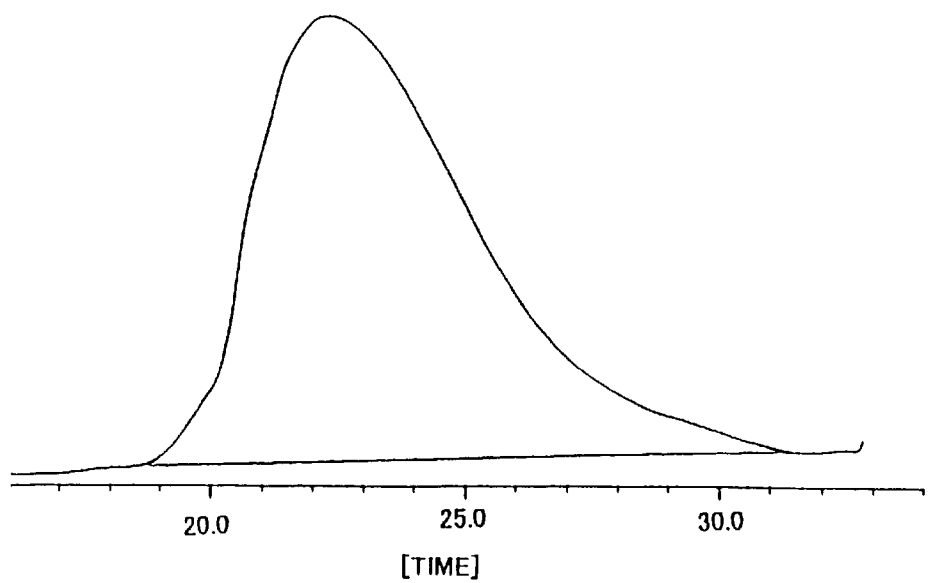
FIG. 4 is a GPC chart of poly(n-butyl acrylate) obtained as a final product in Comparative Example 7 not according to the present invention, drawn with the efflux time as abscissa.

The sample was poured into methanol and the white precipitate so formed was collected and dissolved in tetrahydrofuiran. As a result of measurement by GPC of the resulting solution, it was found that the poly(n-butyl acrylate) thus obtained exhibited a single but wide peak, had a number-average molecular weight (Mn) of 53600 in terms of polystyrene and had a molecular weight distribution (Mw/Mn) of 2.71. The GPC chart of the poly(n-butyl acrylate) so obtained is shown in FIG. 4. The GPC chart revealed that components having a low molecular weight as low as 10000 or less were present in an amount of about 3%.

From the comparison between the preparation example of the acrylic acid ester polymer in Example 6, according to the present invention, and that of the acrylic acid ester polymer in Comparative Example 7, differing from the present invention in the chemical structure of the organoaluminum compound employed, it becomes apparent that because of high living properties (which means a long life of the anionic active end of the living polymer in the reaction system), the polymerization reaction according to the present invention is suited to the continuous monomer feeding polymerization process.

Example 7
Preparation of Poly(n-butyl Acrylate) by Using Isobutylbis (2,6-di-t-butyl-4-methylphenoxy)aluminum In an eggplant-type flask having an internal volume of 100 ml and an internal atmosphere purged with nitrogen, 18.5 ml of a toluene solution (concentration: 0.5 mol/l) of an organoaluminum compound (I) (isobutylbis(2,6-di-t-butyl-4-methylphenoxy)aluminum) prepared in a similar manner to Referential Example 1 was charged and cooled to −5° C. To the solution, 0.58 ml of a pentane solution (1.6 mol/l) of t-butyl lithium was added, followed by stirring for one hour, whereby an initiator-system solution was prepared. After 28 ml of dry toluene was charged in an ampoule tube having an internal volume of 100 ml and an internal atmosphere purged with nitrogen and was cooled to −78° C., 12.7 ml of the above-described initiator-system solution was added. To the resulting mixture, 6.9 ml of n-butyl acrylate was added, whereby polymerization was initiated. By the addition of n-butyl acrylate, the solution changed to a yellow transparent solution. After 17 hours, the polymerization was terminated by the addition of methanol.

A portion of the resulting colorless transparent solution was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%. The sample was poured into a large amount of methanol and the resulting precipitate (poly(n-butyl acrylate)) was collected. The poly(n-butyl acrylate) so collected was dissolved in tetrahydrofuran. As a result of GPC measurement of the resulting solution, it was found that the poly(n-butyl acrylate) had a number-average molecular weight (Mn) of 39000 and molecular weight distribution (Mw/Mn) of 1.05.

Example 8
Preparation of Poly(n-butyl Acrylate) by Using Isobutylbis (2,6-di-t-butyl-4-methylphenoxy)aluminum (Including Washing Treatment)

In a Schlenk's tube having an internal volume of 100 ml and an internal atmosphere purged with nitrogen, 16 ml of dry toluene was charged, followed by cooling to −78° C. Then, 1.33 ml of a toluene solution (concentration: 0.5 mol/l) of an organoaluminum compound (I) (isobutylbis(2,6-di-t-butyl-4-methylphenoxy)aluminum) prepared in a similar manner to Referential Example 1 was added. To the resulting mixture, 0.04 ml of a pentane solution (1.6 mol/l) of t-butyl lithium was added. After stirring, 1.12 ml of n-butyl acrylate was added to initiate the polymerization. By the addition of n-butyl acrylate, the polymer solution changed to a yellow transparent solution. After 14 hours, methanol was added to terminate the polymerization.

A portion of the resulting solution was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%.

The remaining portion of the solution after the termination of the polymerization was washed five times with 50 ml portions of an aqueous solution containing 20 wt. % of citric acid and then three times with 50 ml portions of distilled water, whereby metal components (residues of the organolithium compound and organoaluminum compound) were removed. The residual organic phase was poured into a large amount of methanol and the precipitate so obtained was collected. The precipitate was found to be poly(n-butyl acrylate) substantially free from a metal component. The poly(n-butyl acrylate) was dissolved in tetrahydrofuiran. As a result of GPC measurement of the resulting solution, it was found to have a number average molecular weight (Mn) of 38000 and molecular weight distribution (Mw/Mn) of 1.07.

Example 9
Preparation of an MMA-nBA(crystalline) Block Copolymer (1) In Schlenk's tube having an internal volume of 120 ml and an internal atmosphere purged with argon, 14 ml of dry toluene was charged and then cooled to −30° C. To the tube, 3.76 ml of a toluene solution (concentration: 0.5 moil1) of an organoaluminum compound (I) (isobutylbis(2,6-di-t-butyl-4-methylphenoxy)aluminum) prepared in a similar manner to Referential Example 1 was added, followed by the addition of 0.12 ml of a pentane solution (concentration: 1.6 mol/l) of t-butyl lithium. After stirring, 2.0 ml of methyl methacrylate was added and polymerization was conducted for 18 hours.

(2) A portion of the solution obtained in the above step (1) was sampled and dissolved in deuterated chloroform. As a result of $^1$H-NMR measurement of the resulting solution, no peak derived from the methyl methacrylate monomer was observed, indicating that the polymerization ratio of the methyl methacrylate was at least 98%. The sample was poured into a large amount of methanol and white precipitate (poly(methyl methacrylate)) so formed was collected. The precipitate was dissolved in tetrahydrofuran. As a result of GPC measurement of the resulting solution, poly(methyl methacrylate) thus obtained was found to have a number average molecular weight (Mn) of 13000 in terms of polystyrene and a molecular weight distribution (Mw/Mn) of 1.03. In addition, $^1$H-NMR analysis of the poly(methyl methacrylate) revealed that it had a 83% content of syndiotactic triads (rr).

(3) The remaining portion of the solution obtained in the above step (1) was cooled to −78° C. immediately after the completion of the polymerization in the step (1). To the solution, 2.0 ml of n-butyl acrylate was added as a second monomer and polymerization was effected for about 16 hours.

(4) A portion of the solution obtained in the above step (3) was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%.

(5) The remaining portion of the solution obtained in the step (3) was poured into methanol and white precipitate so formed was collected. The precipitate was dissolved in tetrahydrofuran. As a result of GPC measurement of the resulting solution, it was found that the resulting polymer exhibited a single peak, a number-average molecular weight (Mn) of 28000 in terms of polystyrene and a molecular weight distribution (Mw/Mn) of 1.10. The above-described white precipitate was dissolved in deuterated chloroform. As a result of $^1$H-NMR measurement of the resulting solution, the resulting polymer was found to be a diblock copolymer having a methyl methacrylate polymer block and an n-butyl acrylate polymer block at a weight ratio of 51.8:48.2, which was substantially similar to the ratio of the charged monomers (methyl methacrylate:n-butyl acrylate=51.1:48.9 (weight ratio)). In addition, as a result of the analysis of the diblock copolymer by $^{13}$C-NMR, the portion of the n-butyl acrylate polymer block had a 56% content of syndiotactic triads (rr).

(6) By the DSC measurement of the diblock copolymer obtained in the above step (5), an endothermic peak was confirmed at 51° C. while spherulites were confirmed by the observation through an optical microscope. The crystals were melted by heating to about 70° C. On the other hand, the poly(methyl methacrylate) obtained in the above step (2) was subjected to DSC measurement and observation through an optical microscope, however resulting in the confirmation of neither endothermic peak nor crystals. Based on the above results, the n-butyl acrylate polymer block portion of the diblock copolymer was found to have crystallizability.

Example 10

Preparation of an MMA-nBA (amorphous) Block Copolymer (1) In Schlenk's tube having an internal volume of 120 ml and an internal atmosphere purged with argon, 14 ml of dry toluene was charged and then cooled to −78° C. To the tube, 3.76 ml of a toluene solution (concentration: 0.5 mol/l) of an organoaluminum compound (I) (isobutylbis(2,6-di-t-butyl-4-methylphenoxy)aluminum) prepared in a similar manner to Referential Example 1 was added, followed by the addition of 0.12 ml of a pentane solution (concentration: 1.6 mol/l) of t-butyl lithium. After stirring, 2.0 ml of methyl methacrylate was added and the resulting mixture was polymerized for 18 hours at a temperature elevated to and maintained at −30° C.

(2) A portion of the solution obtained in the above step (1) was sampled and dissolved in deuterated chloroform. As a result of $^1$H-NMR measurement of the resulting solution, no peak derived from the methyl methacrylate monomer was observed, indicating that the polymerization ratio of the methyl methacrylate was at least 98%. The sample was poured into a large amount of methanol and the white precipitate (poly(methyl methacrylate)) so formed was collected. The precipitate was dissolved in tetrahydrofuran. As a result of GPC measurement of the resulting solution, the resulting poly(methyl methacrylate) was found to have a number average molecular weight (Mn) of 12000 in terms of polystyrene and a molecular weight distribution (Mw/Mn) of 1.05. In addition, $^1$H-NMR analysis of the poly(methyl methacrylate) has revealed that it had a 84% content of syndiotactic triads (rr).

(3) The remaining portion of the solution obtained in the above step (1) was cooled to −78° C. immediately after the completion of the polymerization in the step (1). To the solution, 2.0 ml of n-butyl acrylate was added as a second monomer and polymerization was effected for about 4 hours at a temperature elevated to and maintained at −30° C.

(4) A portion of the solution obtained in the above step (3) was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%.

(5) The remaining portion of the solution obtained in the step (3) was poured into methanol and white precipitate so formed was collected. The precipitate was dissolved in tetrahydrofuran. As a result of GPC measurement of the resulting solution, the resulting polymer was found to exhibit a single peak, have a number-average molecular weight (Mn) of 25000 in terms of polystyrene and have a molecular weight distribution (Mw/Mn) of 1.09. The above-described white precipitate was dissolved in deuterated chloroform. As a result of $^1$H-NMR measurement of the resulting solution, the resulting polymer was found to be a diblock copolymer having a methyl methacrylate polymer block and an n-butyl acrylate polymer block at a weight ratio of 51.6:48.4, which was substantially similar to the ratio of the charged monomers (methyl methacrylate:n-butyl acrylate=51.1:48.9 (weight ratio)). In addition, as a result of analysis of the diblock copolymer by $^{13}$C-NMR, the n-butyl acrylate polymer block portion had a 39% content of syndiotactic triads (rr).

(6) Concerning the diblock copolymer obtained in the above step (5), neither endothermic peak was confirmed by DSC nor formation of crystals was confirmed by the observation through an optical microscope.

Example 11

Preparation of an MMA-nBA (amorphous) Block Copolymer (1) In Schlenk's tube having an internal volume of 120 ml and an internal atmosphere purged with argon, 14 ml of dry toluene was charged and then cooled to −78° C. To the tube, 11.3 ml of a solution (concentration: 0.17 mol/l) of an organoaluminum compound (I) (tris(2,6-diphenylphenoxy) aluminum) prepared in a similar manner to Referential Example 6 was added, followed by the addition of 0.12 ml of a pentane solution (concentration: 1.6 mol/l) of t-butyl lithium. After stirring, 2 ml of methyl methacrylate was added and the resulting mixture was polymerized for 18 hours at a temperature elevated to and maintained at −30° C.

(2) A portion of the solution obtained in the above step (1) was sampled and dissolved in deuterated chloroform. As a result of $^1$H-NMR measurement of the resulting solution, no peak derived from the methyl methacrylate monomer was observed, indicating that the polymerization ratio of the methyl methacrylate was at least 98%. The sample was poured into a large amount of methanol and white precipitate so obtained (poly(methyl methacrylate)) was collected. The precipitate was dissolved in tetrahydrofuran. As a result of GPC measurement of the resulting solution, the resulting poly(methyl methacrylate) was found to have a number average molecular weight (Mn) of 11000 in terms of polystyrene and a molecular weight distribution (Mw/Mn) of 1.06. In addition, $^1$H-NMR analysis of the poly(methyl methacrylate) has revealed that it had a 87% content of syndiotactic triads (rr).

(3) The remaining portion of the solution obtained in the above step (1) was cooled to −78° C. immediately after the completion of the polymerization in the step (1). To the solution, 2.0 ml of n-butyl acrylate was added as a second monomer and polymerization was effected for about 4 hours at a temperature elevated to and maintained at −30° C.

(4) A portion of the solution obtained in the above step (3) was sampled and dissolved in deuterated chloroform. As a result of $^1$H-NMR measurement of the resulting solution, no peak derived from the n-butyl acrylate monomer was observed, indicating that the polymerization ratio of the n-butyl acrylate was at least 98%.

(5) The remaining portion of the solution obtained in the step (3) was poured into methanol and white precipitate so formed was collected. The precipitate was dissolved in tetrahydrofuran. As a result of GPC measurement of the resulting solution, the polymer obtained in the above step was found to exhibit a single peak, have a number-average molecular weight (Mn) of 24000 in terms of polystyrene and have a molecular weight distribution (Mw/Mn) of 1.07. The above-described white precipitate was dissolved in deuterated chloroform. As a result of $^1$H-NMR measurement of the resulting solution, the polymer was found to be a diblock copolymer having a methyl methacrylate polymer block and an n-butyl acrylate polymer block at a weight ratio of 51.4:48.6, which was substantially similar to the ratio of the charged monomers (methyl methacrylate:n-butyl acrylate= 51.1:48.9 (weight ratio)). In addition, as a result of analysis of the diblock copolymer by $^{13}$C-NMR, the n-butyl acrylate polymer block portion had a 38% content of syndiotactic triads (rr).

(6) Concerning the diblock copolymer obtained in the above step (5), neither endothermic peak was confirmed by DSC nor formation of crystals was confirmed by the observation through an optical microscope.

Example 12
Preparation of an nBA (amorphous)-MMA Block Copolymer (1) In Schlenk's tube having an internal volume of 120 ml and an internal atmosphere purged with argon, 14 ml of dry toluene was charged and then cooled to −30° C. To the tube, 3.76 ml of a toluene solution (concentration: 0.5 mol/l) of an organoaluminum compound (I) (isobutylbis(2,6-di-t-butyl-4-methylphenoxy)aluminum) prepared in a similar manner to Referential Example 1 was added, followed by the addition of 0.12 ml of a pentane solution (concentration: 1.6 mol/l) of t-butyl lithium. After stirring, 2.0 ml of n-butyl acrylate was added at a rate of 0.1 ml/min (time required for addition: 20 minutes) and then the resulting mixture was polymerized for 5 minutes.

(2) A portion of the solution obtained in the above step (1) was sampled and dissolved in deuterated chloroform. As a result of $^1$H-NMR measurement of the resulting solution, no peak derived from the n-butyl acrylate monomer was observed, indicating that the polymerization ratio of n-butyl acrylate was at least 98%. The sampled solution was poured into a large amount of methanol and the precipitate so formed (poly(n-butyl acrylate)) was collected. The precipitate was dissolved in tetrahydrofuran. As a result of GPC measurement of the resulting solution, the resulting poly(n-butyl acrylate) was found to have a number average molecular weight (Mn) of 14000 in terms of polystyrene and a molecular weight distribution (Mw/Mn) of 1.12. In addition, $^{13}$C-NMR analysis of the poly(n-butyl acrylate) has revealed that it had a 34% content of syndiotactic triads (rr).

(3) The remaining portion of the solution obtained in the above step (1) was cooled to −78° C. immediately after the completion of the polymerization in the step (1). To the solution, 2.0 ml of methyl methacrylate was added as a second monomer, followed by stirring at −78° C. for about one hour. Polymerization was effected for 48 hours at a temperature elevated to and maintained at −20° C.

(4) A portion of the solution obtained in the above step (3) was sampled and dissolved in deuterated chloroform. As a result of $^1$H-NMR measurement of the resulting solution, no peak derived from the methyl methacrylate monomer was observed, indicating that the polymerization ratio of the methyl methacrylate was at least 98%.

(5) The remaining portion of the solution obtained in the step (3) was poured into methanol and white precipitate so formed was collected. The precipitate was dissolved in tetrahydrofuran. As a result of GPC measurement of the resulting solution, the polymer obtained above was found to exhibit a single peak and have a number-average molecular weight (Mn) of 27000 in terms of polystyrene and a molecular weight distribution (Mw/Mn) of 1.20. The above-described white precipitate was dissolved in deuterated chloroform. As a result of $^1$H-NMR measurement of the resulting solution, the polymer was found to be a diblock copolymer having a methyl methacrylate polymer block and an n-butyl acrylate polymer block at a weight ratio of 51.6:48.4, which was substantially similar to the ratio of the charged monomers (methyl methacrylate:n-butyl acrylate= 51.1:48.9 (weight ratio)).

(6) Concerning the diblock copolymer obtained in the above step (5), neither endothermic peak was confirmed by the measurement of DSC nor formation of crystals was confirmed by the observation through an optical microscope.

Example 13
Preparation of an MMA-nBA (amorphous)-MMA Block Copolymer (1) In Schlenk's tube having an internal volume of 120 ml and an internal atmosphere purged with argon, 15 ml of dry toluene was charged, followed by the addition of 3.76 ml of a toluene solution (concentration: 0.5 mol/l) of an organoaluminum compound (I) (isobutylbis(2,6-di-t-butyl-4-methylphenoxy)aluminum), which had been prepared in a similar manner to Referential Example 1, at room temperature (23° C.). The resulting solution was cooling to −30° C. A pentane solution (0.12 ml, concentration: 1.6 mol/l) of t-butyl lithium was added and the resulting mixture was stirred. After 10 minutes, 1.0 ml of methyl methacrylate was added in portions to initiate polymerization. After the completion of the addition, polymerization was conducted for 8 hours while maintaining the temperature at −30° C.

(2) A portion of the solution obtained in the above step (1) was sampled and dissolved in deuterated chloroform. As a result of $^1$H-NMR measurement of the resulting solution, no peak derived from the methyl methacrylate monomer was observed, indicating that the polymerization ratio of the methyl methacrylate was at least 98%. The sampled solution was poured into a large amount of methanol and the white precipitate so formed (poly(methyl methacrylate)) was collected. The precipitate was dissolved in tetrahydrofuran. As a result of GPC measurement of the resulting solution, the resulting poly(methyl methacrylate) was found to have a number average molecular weight (Mn) of 7000 in terms of polystyrene and a molecular weight distribution (Mw/Mn)

of 1.12. In addition, $^1$H-NMR analysis of the poly(methyl methacrylate) has revealed that it had a 82% content of syndiotactic triads (rr).

(3) Immediately after the completion of the polymerization in the step (1), 30 ml of dry toluene and a monomer mixture (second monomer) composed of 1.0 ml of methyl methacrylate and 5.0 ml of n-butyl acrylate were added to the remaining portion of the solution obtained in the above step (1), while maintaining the temperature at 30° C. After the addition, polymerization was effected for 30 minutes while maintaining the same temperature.

(4) A portion of the solution obtained in the above step (3) was sampled and dissolved in deuterated chloroform. As a result of $^1$H-NMR measurement of the resulting solution, no peak derived from the n-butyl acrylate monomer existed and only a peak derived from the methyl methacrylate monomer was confirmed. As a result, it was found that the polymerization ratio of the n-butyl acrylate was at least 98%, while the polymerization ratio of the methyl methacrylate added was 3% or less judging from the integral ratio of the peak derived from the methyl methacrylate monomer and the integral ratio of the peak derived from the methyl methacrylate polymer.

(5) The polymerization of the remaining portion of the solution obtained in the step (3) was continued at −30° C. for further 48 hours.

(6) A portion of the solution obtained in the above step (5) was sampled and dissolved in deuterated chloroform. As a result of $^1$H-NMR measurement of the resulting solution, neither a peak derived from the n-butyl acrylate monomer nor a peak derived from the methyl methacrylate monomer existed. As a result, it was found that the polymerization ratio of each of the n-butyl acrylate and methyl methacrylate was at least 98%.

The solution sampled was poured into methanol and white precipitate so formed was collected. A portion of the precipitate was dissolved in tetrahydrofuran. As a result of GPC measurement of the resulting solution, the polymer obtained above was found to have a number-average molecular weight (Mn) of 54000 in terms of polystyrene and a molecular weight distribution (Mw/Mn) of 1.29. The remaining portion of the white precipitate was dissolved in deuterated chloroform and the resulting solution was subjected to $^1$H-NMR measurement. From the results of $^1$HNMR measurement and the above-described data, the polymer was found to be a triblock copolymer composed of methyl methacrylate polymer block-n-butyl acrylate polymer block-methyl methacrylate polymer block and containing the methyl methacrylate polymer block and n-butyl acrylate polymer block at a weight ratio of 30:70. In addition, as a result of analysis of the trlblock copolymer by $^{13}$C-NMR, the n-butyl acrylate polymer block portion had a 33% content of syndiotactic triads (rr).

(7) To the remaining portion of the solution obtained in the above step (5), 0.02 ml of methanol was added to terminate the polymerization.

The resulting solution was washed five times with 50 ml portions of an aqueous solution containing citric acid in an amount of 20 wt. % and then three times with 50 ml portions of distilled water to remove the metal components (residues of the organolithium compound and organoaluminum compound). The remaining organic phase was poured into a large amount of methanol and white precipitate so formed was collected. The resulting precipitate was a triblock copolymer substantially free from metal components.

(8) Concerning the triblock copolymer obtained in the above step (7), neither endothermic peak was confirmed by DSC nor formation of crystals was confirmed by the observation through an optical microscope.

Example 14

Preparation of an MMA-nBA (crystalline)-MMA Block Copolymer (1) In Schlenk's tube having an internal volume of 120 ml and an internal atmosphere purged with argon, 5 ml of dry toluene was charged, followed by the addition of 3.76 ml of a toluene solution (concentration: 0.5 mol/l) of an organoaluminum compound (I) (isobutylbis(2,6-di-t-butyl-4-methylphenoxy)aluminum), which had been prepared in a similar manner to Referential Example 1, at room temperature (23° C.). After cooling to −30° C., 0.12 ml of a pentane solution (concentration: 1.6 mol/l) of t-butyl lithium was added to the resulting solution, followed by stirring. After 10 minutes, 1 ml of methyl methacrylate was added in portions to initiate polymerization. After the completion of the addition, polymerization was conducted for 6 hours while maintaining the temperature at −30° C.

(2) A portion of the solution obtained in the above step (1) was sampled and dissolved in deuterated chloroform. As a result of $^1$H-NMR measurement of the resulting solution, no peak derived from the methyl methacrylate monomer was observed, indicating that the polymerization ratio of the methyl methacrylate was at least 98%. The sampled solution was poured into a large amount of methanol and the white precipitate so formed (poly(methyl methacrylate)) was collected. The precipitate was dissolved in tetrahydrofuran. As a result of GPC measurement of the resulting solution, the resulting poly(methyl methacrylate) was found to have a number average molecular weight (Mn) of 7000 in terms of polystyrene and a molecular weight distribution (Mw/Mn) of 1.12. Moreover, $^1$H-NMR analysis of the poly(methyl methacrylate) has revealed that it had an 82% content of syndiotactic triads (rr).

(3) Immediately after the completion of the polymerization in the step (1), the remaining portion of the solution obtained in the above step (1) was cooled to −78° C., followed by the addition of 5.0 ml of n-butyl acrylate (second monomer) and 15 ml of dry toluene. After the completion of the addition, the resulting solution was stirred at −78° C. for 30 min, and then the temperature elevated to −60° C., followed by the polymerization for 5 hours at the temperature.

(4) A portion of the solution obtained in the above step (3) was sampled and dissolved in deuterated chloroform. As a result of $^1$H-NMR measurement of the resulting solution, no peak derived from the n-butyl acrylate monomer existed, indicating that the polymerization ratio of the n-butyl acrylate was at least 98%.

The sampled solution was poured into methanol and the white precipitate so formed was collected. A portion of the white precipitate was dissolved in tetrahydrofuran. As a result of GPC measurement of the resulting solution, the resulting polymer exhibited a single peak, had a number average molecular weight (Mn) of 46000 in terms of polystyrene and a molecular weight distribution (Mw/Mn) of 1.11. The remaining portion of the white precipitate was dissolved in deuterated chloroform and the resulting solution was subjected to $^1$H-NMR measurement. As a result, the resulting polymer was found to be a diblock copolymer composed of a methyl methacrylate polymer block and an n-butyl acrylate polymer block at a weight ratio of 16.8:83.2, which was substantially similar to the ratio of the charged monomers (methyl methacrylate:n-butyl acrylate=17.3:82.7 (weight ratio)). In addition, as a result of analysis of the diblock copolymer by $^{13}$C-NMR, the n-butyl acrylate polymer block portion was found to have a 48% content of syndiotactic triads (rr).

(5) After the completion of the polymerization in the above step (3), the remaining portion of the solution obtained in the step (3) was cooled to −78° C., followed by the addition of 1.0 ml of methyl methacrylate (third monomer). After the solution was stirred at −78° C. for about 30 min, a temperature elevated to −20° C. and then polymerization was conducted for 10 hours while maintaining the temperature at −20° C.

(6) A portion of the solution obtained in the above step (5) was sampled and dissolved in deuterated chloroform. As a result of $^1$H-NMR measurement of the resulting solution, no peak derived from the methyl methacrylate monomer existed, indicating that the polymerization ratio of the methyl methacrylate was at least 98%.

The sampled solution was poured into methanol and white precipitate so formed was collected. A portion of the precipitate was dissolved in tetrahydrofuran. As a result of GPC measurement of the resulting solution, the polymer obtained in the step (5) was found to have a number-average molecular weight (Mn) of 55000 in terms of polystyrene and molecular weight distribution (Mw/Mn) of 1.12.

The remaining portion of the white precipitate was dissolved in deuterated chloroform and the resulting solution was subjected to $^1$H-NMR measurement. As a result, the weight ratio of the methyl methacrylate polymer block n-butyl acrylate polymer block of the polymer obtained in the step (5) was 28.9:71.1, which was substantially similar to the ratio of the charged monomers (methyl methacrylate:n-butyl acrylate=29.5:70.5 (weight ratio)). Judging from the ratio (28.9:71.1) determined here and the methyl methacrylate polymer block:n-butyl acrylate polymer block ratio (16.8:83.2) of the diblock copolymer obtained in the step (4), the polymer formed in the step (5) was found to be a triblock copolymer composed of methyl methacrylate polymer block:n-butyl acrylate polymer block-:methyl methacrylate polymer block at a weight ratio of 15:71:14.

(7) To the remaining portion of the solution obtained in the above step (5), 1 ml of methanol was added to terminate the polymerization.

The resulting solution was washed five times with 50 ml portions of an aqueous solution containing citric acid in an amount of 20 wt. % and then three times with 50 ml portions of distilled water to remove the metal components (residues of the organolithium compound and organoaluminum compound). The remaining organic phase was poured into a large amount of methanol and white precipitate so formed was collected. The resulting precipitate was a triblock copolymer substantially free from metal components.

(8) As a result of DSC measurement of the triblock copolymer obtained in the step (7), an endothermic peak was confirmed at 43° C., while spherulites were confirmed by the observation through an optical microscope. Those crystals were melted by heating to about 60° C. On the other hand, neither endothermic peak nor crystals were confirmed even by the DSC measurement and observation through an optical microscope of the poly(methyl methacrylate) obtained in the step (2). Accordingly. it was found that the triblock copolymer obtained in the above process had crystallizability at the n-butyl acrylate polymer block portion.

Example 15
Preparation of an MMA-nBA (amosphous) Block Copolymer (1) In Schlenk's tube having an internal volume of 120 ml and an internal atmosphere purged with argon, 14 ml of dry toluene was charged. After cooling to −78° C. 3.76 ml of a solution (concentration: 0.5 mol/l) of an organoaluminum compound (I) (n-octylbis(2,6-di-t-butyl-4-methylphenoxy) aluminum) prepared in a similar manner to Referential Example 2 was added. To the resulting mixture, 0.12 ml of a pentane solution (concentration: 1.6 mol/l) of t-butyl lithium was added, followed by stirring. To the reaction mixture, 2.0 ml of methyl methacrylate was added and polymerization was conducted for 18 hours at a temperature elevated to and maintained at −30° C.

(2) A portion of the solution obtained in the above step (1) was sampled and dissolved in deuterated chloroform. As a result of $^1$H-NMR measurement of the resulting solution, no peak derived from the methyl methacrylate monomer was observed, indicating that the polymerization ratio of the methyl methacrylate was at least 98%. The sampled solution was poured into a large amount of methanol and the white precipitate so formed (poly(methyl methacrylate)) was collected. The precipitate was dissolved in tetrahydrofuran. As a result of GPC measurement of the resulting solution, the resulting poly(methyl methacrylate) was found to have a number average molecular weight (Mn) of 12000 in terms of polystyrene and a molecular weight distribution (Mw/Mn) of 1.08. In addition, $^1$H-NMR analysis of the poly(methyl methacrylate) has revealed that it had a 85% content of syndiotactic triads (rr).

(3) Immediately after the completion of the polymerization in the step (1), the remaining portion of the solution obtained in the above step (1) was cooled to −78° C., followed by the addition of 2.0 ml of n-butyl acrylate as a second monomer. Polymerization was then effected for 4 hours at a temperature elevated to and maintained at −30° C.

(4) A portion of the solution obtained in the above step (3) was sampled and dissolved in deuterated chloroform. As a result of $^1$H-NMR measurement of the resulting solution, no peak derived from the n-butyl acrylate monomer existed, indicating that the polymerization ratio of the n-butyl acrylate was at least 98%.

(5) The remaining portion of the solution obtained in the step (3) was poured into methanol and the white precipitate so formed was collected. The white precipitate was dissolved in tetrahydrofuran. As a result of GPC measurement of the resulting solution, the resulting polymer exhibited a single peak, had a number-average molecular weight (Mn) of 23000 in terms of polystyrene and molecular weight distribution (Mw/Mn) of 1.07. In addition, the white precipitate was dissolved in deuterated chloroform and the resulting solution was subjected to $^1$H-NMR measurement. As a result, the resulting polymer was found to be a diblock copolymer composed of a methyl methacrylate polymer block and an n-butyl acrylate polymer block at a weight ratio of 51.0:49.0, which was substantially similar to the ratio of the charged monomers (methyl methacrylate:n-butyl acrylate=51.1:48.9 (weight ratio)). Moreover, as a result of analysis of the diblock copolymer by $^{13}$C-NMR, the n-butyl acrylate polymer block portion was found to have a 35% content of syndiotactic triads (rr).

(6) In the diblock copolymer obtained in the step (5), neither endothermic peak was confirmed by the DSC measurement nor formation of crystals was confirmed by observation through an optical microscope.

Comparative Example 8
Trial Preparation of a Block Copolymer (1) In Schlenk's tube having an internal volume of 120 ml and an internal atmosphere purged with argon, 14 ml of dry toluene was charged. After cooling to −78° C., 3.76 ml of a toluene solution (concentration: 0.5 mol/l) of triisobutylaluminum was added. To the resulting mixture, 0.12 ml of a pentane solution (concentration: 1.6 mol/l) of t-butyl lithium was added, followed by stirring. To the reaction mixture, 2.0 ml of methyl methacrylate was added, whereby polymerization was conducted for 48 hours.

(2) A portion of the solution obtained in the above step (1) was sampled and dissolved in deuterated chloroform. As a result of $^1$H-NMR measurement of the resulting solution, no peak derived from methyl methacrylate was observed, indicating that the polymerization ratio of the methyl methacrylate was at least 98%. The sampled solution was poured into a large amount of methanol and the white precipitate so formed (poly(methyl methacrylate)) was collected. The precipitate was dissolved in tetrahydrofuran. As a result of GPC measurement of the resulting solution, the resulting poly(methyl methacrylate) was found to have a number average molecular weight (Mn) of 11300 in terms of polystyrene and a molecular weight distribution (Mw/Mn) of 1.19. Moreover, $^1$H-NMR analysis of the poly(methyl methacrylate) has revealed that it had a 89% of syndiotactic triads (rr).

(3) Immediately after the completion of the polymerization in the step (1), 2.0 ml of n-butyl acrylate was added, as a second monomer, to the remaining portion of the solution obtained in the above step (1) while maintaining the temperature at −78° C., whereby polymerization was effected for 24 hours.

(4) A portion of the solution obtained in the above step (3) was sampled and dissolved in deuterated chloroform. As a result of $^1$H-NMR measurement of the resulting solution, no peak derived from the n-butyl acrylate polymer was confirmed. It was found from the area ratio of the peak derived from an n-butyl acrylate monomer and the peak derived from the methyl methacrylate polymer, each obtained by the $^1$H-NMR measurement, that the n-butyl acrylate was not polymerized.

The sampled solution was poured into methanol and the white precipitate so formed was collected. The white precipitate was dissolved in tetrahydrofuran. As a result of GPC measurement of the resulting solution, the polymer obtained in the above step (3) exhibited a single peak, had a number-average molecular weight (Mn) of 11200 in terms of polystyrene and molecular weight distribution (Mw/Mn) of 1.18. The white precipitate was dissolved in deuterated chloroform and the resulting solution was subjected to $^1$HNMR-analysis. As a result, no peak derived from an n-butyl acrylate polymer was confirmed, indicating that the resulting polymer was a homopolymer of methyl methacrylate.

It was found from the results of Comparative Example 8 that a block copolymer composed of a methyl methacrylate polymer block and an n-butyl acrylate polymer block is not available by the polymerization of methyl methacrylate and n-butyl acrylate in the presence of t-butyl lithium and triisobutylaluminum.

Comparative Example 9
Trial Preparation of a Block Copolymer by Using Methylbis(2,6-di-t-butyl-4-methylphenoxy)aluminum (1) In a similar manner to the step (1) of Example 12 except that the toluene solution of an organoaluminum compound was changed to 3.76 ml of a toluene solution (concentration: 0.5 mol/l) of an organoaluminum compound (methylbis(2,6-di-t-butyl-4-methylphenoxy)aluminum) prepared in a similar manner to Referential Example 5, polymerization of n-butyl acrylate was carried out.

(2) A portion of the solution obtained in the above step (1) was sampled and dissolved in deuterated chloroform. As a result of $^1$H-NMR measurement of the resulting solution, it was found that the polymerization ratio of the n-butyl acrylate was 56%. The sampled solution was poured into a large amount of methanol and the precipitate so formed (poly(n-butyl acrylate)) was collected. The precipitate was dissolved in tetrahydrofuran. As a result of GPC measurement of the resulting solution, the poly(n-butyl acrylate) thus obtained was found to have a number average molecular weight (Mn) of 11000 in terms of polystyrene and a molecular weight distribution (Mw/Mn) of 1.46.

(3) In a similar manner to the step (3) of Example 12 except for the use of the remaining portion of the solution obtained in the step (1), methyl methacrylate (second monomer) was polymerized.

(4) A portion of the solution obtained in the above step (3) was sampled and dissolved in deuterated chloroform. As a result of $^1$H-NMR measurement of the resulting solution, the polymerization ratio of the methyl methacrylate was found to be 3% or less.

Comparative Example 10
Trial Preparation of a Block Copolymer by Using Ethylbis(2,6-di-t-butyl-4-methylphenoxy)aluminum (1) In a similar manner to the step (1) of Example 12 except that the toluene solution of an organoaluminum compound was changed to 3.76 ml of a toluene solution (concentration: 0.5 mol/l) of an organoaluminum compound (ethylbis(2,6-di-t-butyl-4-methylphenoxy)aluminum) prepared in a similar manner to Referential Example 3, polymerization of n-butyl acrylate was carried out.

(2) A portion of the solution obtained in the above step (1) was sampled and dissolved in deuterated chloroform. As a result of $^1$H-NMR measurement of the resulting solution, no peak derived from the n-butyl acrylate monomer existed, indicating that the polymerization ratio of the n-butyl acrylate was at least 98%. The sampled solution was poured into a large amount of methanol and the precipitate so formed (poly(n-butyl acrylate)] was collected. The precipitate was dissolved in tetrahydrofuran. As a result of GPC measurement of the resulting solution, the resulting poly(n-butyl acrylate) was found to have a number average molecular weight (Mn) of 15000 in terms of polystyrene and a molecular weight distribution (Mw/Mn) of 1.34.

(3) In a similar manner to the step (3) of Example 12 except for the use of the remaining portion of the solution obtained in the step (1), methyl methacrylate (second monomer) was polymerized.

(4) A portion of the solution obtained in the above step (3) was sampled and dissolved in deuterated chloroform. As a result of $^1$H-NMR measurement of the resulting solution, no peak derived from the methyl methacrylate monomer existed, indicating that the polymerization ratio of the methyl methacrylate was at least 98%.

(5) The remaining portion of the solution obtained in the step (3) was poured into methanol and the white precipitate so formed was collected. The precipitate was dissolved in tetrahydrofuran. As a result of GPC measurement of the resulting solution, it was found that the resulting polymer exhibited double peaks derived from the poly(n-butyl acrylate) component formed in the step (1) and a block copolymer component, and the block copolymer component portion had a number average molecular weight (Mn) of 59000 in terms of polystyrene and a molecular weight distribution (Mw/Mn) of 1.63. From the above finding, the number average molecular weight of the poly(methyl methacrylate) block formed in the second-stage polymerization in the step (3) was estimated at 44000 and the polymerization initiation efficiency (that is, block formation efficiency) of methyl methacrylate in the second stage to the poly(n-butyl acrylate) anions formed in the step (1) was calculated to be about 32%.

Obviously, additional modifications and variations of the present invention are possible in light of the above teachings. It is therefore to be understood that within the scope of the appended claims, the invention may be practiced otherwise than as specifically described herein.

The priority documents of the present invention, Japanese patent applications 94021/1998, filed Mar. 23, 1998 and 159940/1998, filed May 25, 1998, are incorporated herein by reference.

What is claimed is:

1. A process for the preparation of a block copolymer having at least one polymer block (A) comprising a polymerized acrylic acid ester (a) and at least one polymer block (B) comprising another polymerized acrylic or polymerized methacrylic monomer (b) having a chemical structure different from said acrylic acid ester (a), comprising:

polymerizing said acrylic acid ester (a) and said monomer (b) in the presence of an organolithium compound and an organoaluminum compound represented by the following formula (I):

$$AlR^1R^2R^3 \tag{I}$$

wherein $R^1$ represents a substituted or unsubstituted alkyl group having at least 3 carbon atoms, a substituted or unsubstituted alkoxy group having at least 3 carbon atoms or a substituted or unsubstituted aryloxy group, $R^2$ and $R^3$ each independently represent a substituted or unsubstituted aryloxy group, or together form a substituted or unsubstituted arylenedioxy group.

2. A process according to claim 1, wherein $R^1$ represents a branched $C_{3-12}$ alkyl group.

3. A process according to claim 1, wherein $R^1$ represents a linear $C_{4-12}$ alkyl group.

4. A process according to claim 1, wherein the polymerizing comprises adding the acrylic acid ester (a) and the monomer (b) successively, simultaneously or both successively and simultaneously.

5. A process according to claim 1, wherein the polymerizing comprises contacting the organolithium compound with the organoaluminum compound and then with the acrylic acid ester (a), the monomer (b) or both the acrylic acid ester (a) and the monomer (b); or contacting the organolithium compound with a portion of the organoaluminum compound and then with a mixture comprising the acrylic acid ester (a), the monomer (b) or both the acrylic acid ester (a) and the monomer (b), and the remaining portion of the organoaluminum compound.

6. A process according to claim 1, wherein the acrylic acid ester (a) is a primary alkyl acrylate.

7. A process according to claim 1, wherein the organoaluminum compound is at least one compound selected from the group consisting of isobutylbis(2,6-di-t-butyl-4-methylphenoxy)aluminum, isobutylbis(2,6-di-t-butylphenoxy)aluminum, isobutyl(2,2'-methylenebis(4-methyl-6-t-butylphenoxy))aluminum, n-octylbis(2,6-di-t-butyl-4-methylphenoxy)aluminum, n-octylbis(2,6-di-t-butylphenoxy)aluminum, n-octyl(2,2'-methylenebis(4-methyl-6-t-butylphenoxy))aluminum, tris(2,6-di-t-butyl-4-methylphenoxy)aluminum and tris(2,6-diphenylphenoxy)aluminum.

8. A process according to claim 1, further comprising, after the polymerizing, removing metal components contained in the polymer by washing the polymer with an aqueous acidic solution.

9. A process according to claim 1, further comprising isolating said block copolymer.

10. A process according to claim 6, further comprising isolating said block copolymer.

11. A process according to claim 8, further comprising isolating said block copolymer.

12. A process according to claim 9, further comprising molding said block copolymer.

13. A process according to claim 10, further comprising molding said block copolymer.

14. A process according to claim 11, further comprising molding said block copolymer.

15. The product produced by the process of claim 1, wherein said product has crystalizability.

16. The product produced by the process of claim 6, wherein said product has crystalizability.

17. The product produced by the process of claim 8, wherein said product has crystalizability.

18. The product produced by the process of claim 1, wherein said product has a stereoregularity of 35% or greater in terms of a content of syndiotactic triads (rr).

19. The product produced by the process of claim 6, wherein said product has a stereortgularity of 35% or greater in terms of a content of syndiotactic triads (rr).

20. The product produced by the process of claim 8, wherein said product has a stereoregularity of 35% or greater in terms of a content of syndiotactic triads (rr).

* * * * *